(12) United States Patent
Tsukamoto

(10) Patent No.: US 6,359,837 B1
(45) Date of Patent: Mar. 19, 2002

(54) CAMERA, CAMERA SYSTEM, INFORMATION RECORDING SYSTEM, TIMEPIECE, AND LINK SYSTEM FOR CAMERA AND TIMEPIECE

(75) Inventor: Akihiro Tsukamoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/593,100

(22) Filed: Jun. 13, 2000

(30) Foreign Application Priority Data

Jun. 30, 1999 (JP) .......................................... 11-185580
Sep. 28, 1999 (JP) .......................................... 11-273960
Jan. 21, 2000 (JP) .......................................... 12-012421

(51) Int. Cl.$^7$ ........................ G04B 47/00; G03B 17/24; G03B 13/02
(52) U.S. Cl. ............................ 368/10; 396/56; 396/318
(58) Field of Search ............................. 368/10, 46, 47, 368/82–84; 396/56, 310, 318

(56) References Cited

U.S. PATENT DOCUMENTS 4,198,146 A * 4/1980 Taguchi et al. ............. 354/106
6,269,446 B1 * 7/2001 Schumacher et al. ....... 713/176

* cited by examiner

Primary Examiner—Vit Miska
(74) Attorney, Agent, or Firm—Frishauf, Holtz, Goodman, Langer & Chick, P.C.

(57) ABSTRACT

A combination of a camera and wristwatch, and a new application of a wristwatch that comprises a display device. The camera has recording means for electronically recording an image of an object, and transmission means for transmitting the recorded image on a radio wave. The wristwatch has display means that can display the current time and image, reproduction means for receiving the radio wave from the camera located at a nearby position, and reproducing the image, and display control means for controlling the display means to display the reproduced image. The image sensed by the camera is transmitted to the wristwatch located at a nearby position by radio, and can be displayed on the display means of the wristwatch.

51 Claims, 35 Drawing Sheets

| IMAGE DATA NO. | AUDIO DATA NO. |
|---|---|
| 1 | 102 |
| 2 | — |
| 3 | 103 |
| 4 | — |

FIG.34

CAMERA, CAMERA SYSTEM, INFORMATION RECORDING SYSTEM, TIMEPIECE, AND LINK SYSTEM FOR CAMERA AND TIMEPIECE

CROSS-REFERENCE TO RELATED APPLICATIONS

This application is based on Japanese Patent Applications No. 11-185580, filed Jun. 30, 1999; No. 11-273960, filed Sep. 28, 1999; and No. 2000-012421, filed Jan. 21, 2000, the contents of which are incorporated herein by reference.

BACKGROUND OF THE INVENTION

The present invention relates to a link system for a camera and wristwatch and, more particularly, to a link system for a wristwatch which comprises a display device that can display image information such as an image and the like in addition to time information, and a camera, or an information system which transfers date information acquired by a wristwatch to a camera to implement, e.g., date management of image recording.

In recent years, wristwatches which comprise display devices (normally, liquid crystal displays) having a large number of pixels have prevailed. Most of such wristwatches can display text information such as an address book, schedule table, or the like, and even image information such as an image or the like in addition to time information, by fully utilizing their display performance.

On the other hand, portable digital cameras (to be simply referred to as "digital cameras" hereinafter) have also prevailed. The user can carry a digital camera on a trip or mountain-climbing, and can take and electronically record images in various situations. Recently, wristwatches which incorporate a temperature sensor, atmospheric pressure sensor, humidity sensor, azimuth sensor, water depth sensor, blood pressure sensor, pedometer, position sensor, and the like, and display measurement results are commercially available.

Although these wristwatch and camera are portable electronic apparatuses, since there is no idea to use them in combination, they are individually used to confirm the time and to record images, i.e., they are useful only as standalone apparatuses.

BRIEF SUMMARY OF THE INVENTION

It is an object of the present invention to provide a camera, a camera system, an information recording system, a timepiece, and a link system for a camera and timepiece, which can systematically use the camera and timepiece in combination.

According to the first aspect of the present invention, a link system for a camera and wristwatch, comprises:

a camera which comprises recording means for electronically recording an image of an object, and transmission means for transmitting the recorded image on a radio wave; and a wristwatch which comprises display means that can display a current time and image, reproduction means for receiving the radio wave from the camera located at a nearby position, and reproducing the image, and display control means for controlling the display means to display the reproduced image.

According to the second aspect of the present invention, a camera system comprises:

a camera which comprises image sensing means, recording control means for recording an image sensed by the image sensing means on a memory, and transmission means for transmitting the sensed image by a radio wave; and a timepiece which comprises display means that can display a current time and image, reception means for receiving the radio wave from the camera located at a nearby position, and display control means for controlling the display means to display the received image, and the camera comprises a shutter, the recording control means records the image sensed by the image sensing means on the memory in response to operation of the shutter, and the camera has transmission control means for controlling the transmission means to transmit the sensed image in response to operation of the shutter.

According to the third aspect of the present invention, an information recording system has information acquisition means for acquiring or generating information required for a daily life or specific action, and image recording means for recording an image, the information acquisition means and image recording means respectively have a portable shape and comprise wireless data transmission/reception means, the information acquisition means comprises transfer control means for transferring the acquired or generated information to the image recording means via the data transmission/reception means, and the image recording means comprises recording control means for recording the information transferred via the data transmission/reception means together with an image.

According to the fourth aspect of the present invention, a wristwatch used in a camera system including a wristwatch having time measurement means, and a camera apparatus having image sensing means, comprises:

transmission means for transmitting data of time or date information measured by the time measurement means to the camera apparatus.

According to the fifth aspect of the present invention, a camera apparatus used in a camera system including a wristwatch having time measurement means, and a camera apparatus having image sensing means, comprises:

reception means for receiving data of time or date information transmitted from the wristwatch.

According to the camera, the camera system, the wristwatch, and the link system for the camera and wristwatch of the present invention, an image taken by the camera can be sent to a nearby wristwatch by radio, and can be displayed on display means of that wristwatch.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 34 shows the memory map of a work RAM in the eighth embodiment;

DETAILED DESCRIPTION OF THE INVENTION

The preferred embodiments of the present invention will be described in detail hereinafter with reference to the accompanying drawings.

Note that the present invention is not limited to an electronic still camera described in the following embodiments, and any other apparatuses may be used as long as they can electronically record images. For example, a moving picture camera may be used, or a portable information terminal, electronic pocketbook, personal computer, or the like, which has an image sensing function, may be used. Also, a wristwatch does not always mean a timepiece worn on a "wrist". For example, any other timepieces can be used as long as they are exclusively used to confirm the time, and have a portable shape.

Furthermore, "image" is a generic term herein, and includes a sensed analog video signal, a composite video signal including luminance and color difference components, a signal compressed by, e.g., JPEG, a signal modulated for communications, a thumbnail the information size of which is reduced, an image to be displayed on a liquid crystal display, and the like.

(First Embodiment)
<Link Arrangement for Camera and Wristwatch According to First Embodiment>

Figure 1:
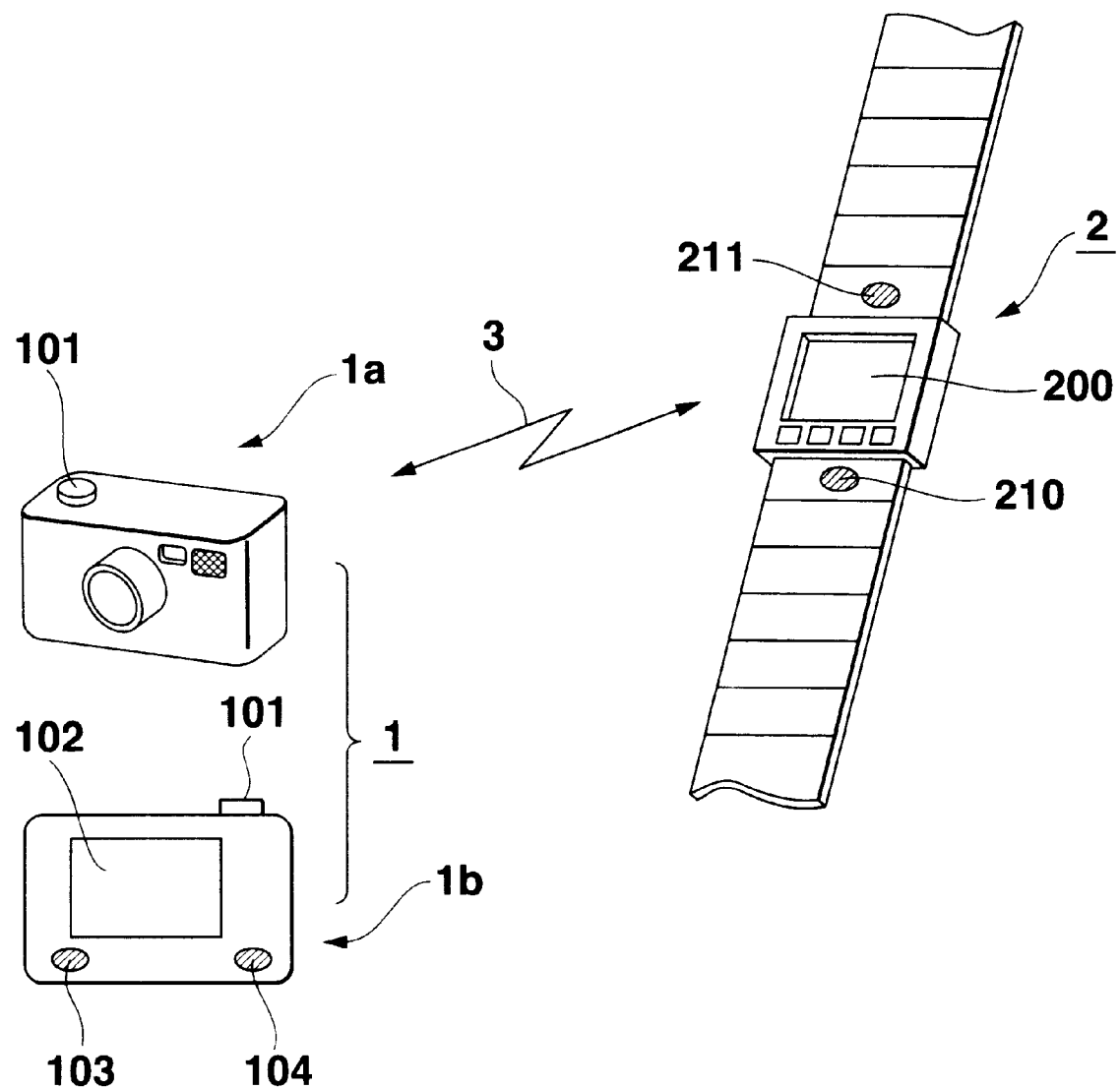
FIG. 1 is a view showing the system arrangement according to the first embodiment of the present invention.

FIG. 1 shows the arrangement of a link system for a camera and wristwatch according to this embodiment. Reference numeral 1 denotes a so-called electronic still camera such as a digital camera that electronically records images; 1a, a front perspective view of the camera 1; and 1b, a rear view of the camera 1. Reference numeral 101 denotes a shutter; 102, a liquid crystal display; 103, a microphone for inputting voice; and 104, a loudspeaker for outputting voice. Reference numeral 2 denotes a wristwatch; 200, a liquid crystal display of the wristwatch; 210, a microphone for inputting voice; and 211, a loudspeaker for outputting voice.

As can be seen from the following description, the electronic still camera 1 and wristwatch 2 respectively have a wireless communication function by a radio wave 3. For example, image information recorded by the electronic still camera 1 can be sent to the wristwatch 2, and can be displayed on the liquid crystal display 200 of the wristwatch 2. Also, a transmission function from the wristwatch 2 to the electronic still camera 1 is available. A transmission pattern from the electronic still camera 1 to the wristwatch 2 includes not only a one-to-one transmission pattern for transmitting single image information to one wristwatch 2 only once, but also a pattern for successively or simultaneously transmitting identical image information to a plurality of wristwatches.

As will be described later, a detailed description of a communication scheme will be omitted since a known communication scheme can be used. Also, an antenna of the electronic still camera 1 is not shown in FIG. 1. One-way communications from the electronic still camera 1 side may be made, or the wristwatch 2 may send back a reply signal to form a link. Furthermore, a wireless LAN may be built. Moreover, infrared ray communications may be used although they suffer a directivity problem.

<Arrangement of Electronic Still Camera in First Embodiment>

Figure 2:
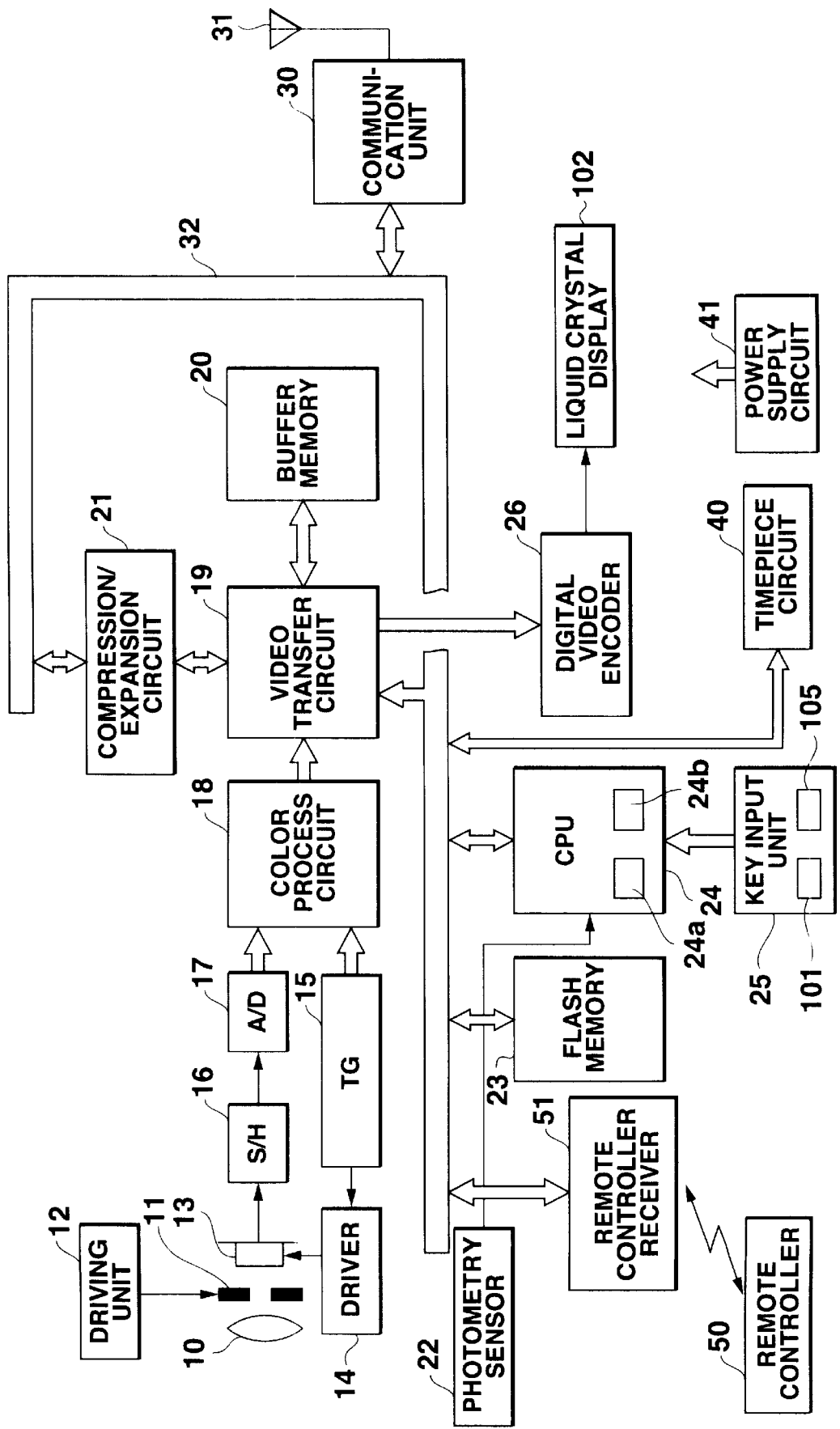
FIG. 2 is a block diagram of an electronic still camera in the first embodiment.

FIG. 2 is a block diagram of the electronic still camera 1. Referring to FIG. 2, reference numeral 10 denotes a photographing lens; 11, a stop mechanism provided on the optical axis of the photographing lens 10; 12, a driving unit for the stop mechanism 11; 13, an image sensing element (to be referred to as a "CCD" hereinafter) for receiving light that has passed through the stop mechanism 11 and outputting a sensed image signal of an object; 14, a driver for driving the CCD 13; 15, a timing generator (abbreviation: TG) for generating various timing signals such as a signal for controlling the charge accumulation time (image sensing time) of the CCD 13, and the like; 16, a sample & hold circuit (abbreviation: S/H) for sampling the sensed image signal output from the CCD 13, and removing noise; and 17, an analog-to-digital converter (abbreviation: A/D) for converting the noise-removed sensed image signal into a digital signal. Note that the image sensing element (image sensor) is not limited to the CCD, but may be other elements such as a C-MOS, camera tube, and the like.

Reference numeral 18 denotes a color process circuit for generating a composite luminance/color difference signal (to be referred to as an "image signal" hereinafter) based on the output from the A/D 17; 19, a video transfer circuit; 20, a buffer memory for holding an image signal; 21, a compression/expansion circuit for compressing/expanding an image signal using a predetermined coding scheme (generally, JPEG); 22, a photometry sensor for measuring the brightness of an object; and 23, a fixed or detachable flash memory for recording a compressed image signal. The buffer memory 20 has an area for storing image for at least one frame. When the buffer memory 20 has a storage area for a plurality of frames to sequentially store sensed images, and the stored images are compressed later, a continuous shot mode can be implemented. The flash memory 23 can save either a compressed or non-compressed image. The memory 23 can also save a thumbnail.

Reference numeral 24 denotes a CPU which executes a control program stored in a program ROM 24a on a work RAM 24b to implement recording/reproduction control processes of images and various control processes associated with these control processes. The work RAM 24b and buffer memory 20 may use an identical memory, or their roles may be switched.

Reference numeral 25 denotes a key input unit for generating a key input signal in response to operation of each of various keys such as a shutter key 101, transfer key 105, and the like; 26, a digital video encoder for converting the image signal held in the buffer memory 20 into a signal format suitable for display; 102, a liquid crystal display as an image monitor for displaying a signal output from the digital video encoder 26; 30, a communication unit which comprises a modulation circuit for exchanging data with an external apparatus (wristwatch 2) via an antenna 31; and 32, a bus for connecting the individual units.

Reference numeral 40 denotes a timepiece circuit which stores date/time information. A time measurement process is implemented by the CPU 24, and the contents of the timepiece circuit 40 are periodically rewritten by the measured date/time information. Reference numeral 41 denotes a power supply circuit for supplying electric power from a battery and secondary battery to the individual units.

Reference numeral 50 denotes a remote controller which exchanges signals with a remote controller receiver 51. The remote controller receiver 51 is controlled by the CPU 24. Shutter operation or the like can be attained by operating the remote controller 50.

The electronic still camera 1 with the above arrangement can be switched between an image recording mode and reproduction mode by a predetermined key operation at the key input unit 25, and the recording mode can be classified into a through mode for converting sensed image signals periodically output from the CCD 13 into those suitable for display, and sequentially displaying the converted signals on the liquid crystal display 102, and a capture mode for recording a required sensed image signal on the flash memory 23 by operating the shutter key 101.

<Through Mode in First Embodiment>

In the through mode, the CCD 13 located behind the photographing lens 10 is driven by a signal from the driver 14, and photoelectrically converts an object image formed by the photographing lens 10 at given periods to output a signal for one image. This signal is sampled by the S/H 16, and is converted by the A/D 17 into a digital signal. The digital signal is input to the color process circuit 18 to generate an image signal. This image signal is transferred to the buffer memory 20 via the video transfer circuit 19. Upon completion of transfer to the buffer, the image signal is read out by the video transfer circuit 19, and is sent to the liquid crystal display 102 via the digital video encoder 26, thus displaying a through image.

<Capture Mode in First Embodiment>

When the angle of the camera is changed in this state, the composition of a through image displayed on the liquid crystal display 102 changes. When the shutter key is pressed to its "half-stroke" position at an appropriate timing (at the timing when a desired composition is obtained) to automatically or manually set the exposure and focus values, and is then pressed to its "full-stroke" position, the camera is switched to the capture mode. In this mode, an image signal saved in an image buffer of the buffer memory 20 is frozen to the one at that time, and a through image displayed on the liquid crystal display 102 is also frozen to the one at the same timing. The image signal saved in the image buffer of the buffer memory 20 at that time is sent to the compression/expansion circuit 21 via the video transfer circuit 19, and its luminance and color difference information components are encoded by JPEG in units of 8×8 basic blocks. The encoded image signal is then recorded (captured) on the flash memory 23.

<Reproduction Mode in First Embodiment>

In the reproduction mode, the route from the CCD 13 to the buffer memory 20 is closed, and the latest capture image is read out from the flash memory 23. The readout image is expanded by the compression/expansion circuit 21, and is sent to the image buffer of the buffer memory 20 via the video transfer circuit 19. The data in the image buffer is sent to the liquid crystal display 102 via the video transfer circuit 19 and digital video encoder 26, and is displayed as a reproduced image.

The reproduced image can be changed to the next or previous one by operating a predetermined key (for example, a plus (+) key or minus (−) key) of the key input unit 25. Also, the reproduced image can be sent to the external apparatus via the communication unit 30 by operating a predetermined function key.

<Arrangement of Wristwatch in First Embodiment>

Figure 3:
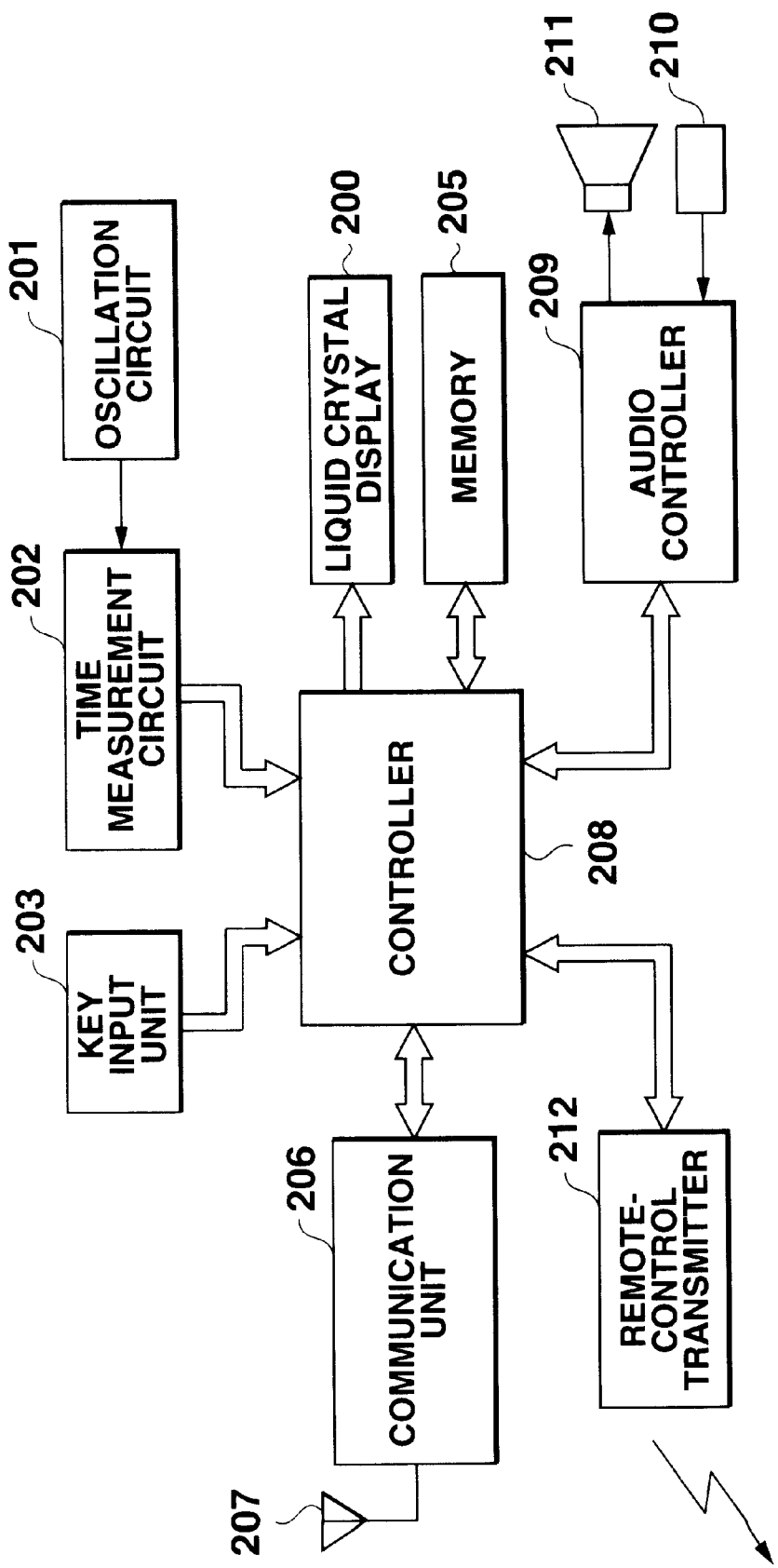
FIG. 3 is a block diagram of a wristwatch in the first embodiment.

FIG. 3 is a block diagram of the wristwatch 2. Referring to FIG. 3, reference numeral 201 denotes an oscillation circuit for generating an accurate frequency signal; 202, a time measurement circuit for generating a date signal which represents the current date and time by frequency-dividing the frequency signal generated by the oscillation circuit 201; 203, a key input unit for generating a key signal for, e.g., time adjustment; 200, a liquid crystal display serving as a display unit; 205, a memory for storing a control program that implements a time measurement function, and various functions associated with that function; 207, an antenna; 206, a communication unit; and 208, a controller for controlling the entire wristwatch by executing the control program.

The memory 205 may have an area for saving the received image. When the received image is displayed only on the liquid crystal display 200 but is not saved, the memory size can be reduced. When the received image is saved in the memory 205, reception date information of that image is preferably saved in its image (its file header or the like), a file system that manages image data, or the like. The date information management function of the file system or the like corresponds to associating means that associates a time or date with an image, and is cited in the gist of the present invention. The date information may be superimposed on an image, or may be used in, e.g., management of images.

The liquid crystal display 200 is a compact flat display device having n×m pixels, and preferably uses the one capable of color or monochrome multi-level display.

Reference numeral 209 denotes an audio controller for receiving voice input via a microphone 210, and outputting voice from a loudspeaker 211. Reference numeral 212 denotes a remote-control transceiver, which has the same function as that of the remote controller 50 shown in FIG. 2, and can remote-control the electronic still camera 1 from the wristwatch 2.

Note that the communication unit 206 implements wireless data connection using the same protocol as that of the communication unit 30 in the electronic still camera 1. The protocol used is not particularly limited as long as it can realize wireless communications. For example, infrared ray communications (IrDA) as a state-of-the-art near-distance wireless communication technique may be used. However, in consideration of shortcomings of IrDA (vulnerable to obstacles), radio communication techniques such as FM (frequency modulation), spread spectrum, and the like with low directivity are preferably used. In such case, even when one of the electronic still camera 1 and wristwatch 2 is put in a pocket or bag, data connection is not disturbed.

For example, a near-distance, weak transmitting power, mobile communication technique called "Bluetooth" that covers a near distance around 10 m using a radio wave in the 2.45 GHz band and implements a maximum data transfer of 721 kbps (transfer rate 1 Mbps: 2 Mbps will be supported in the next version) in one-to-one connection is a preferable candidate technique. Currently, this technique can be implemented by mounting a compact transceiver module as small as about 0.5 m$^2$ (corresponding to the communication units 30 and 206 in FIGS. 2 and 3). In addition, wireless LAN communication schemes such as 64 kbps PHS *Jiei Hyojun* Ver. 3, 11 Mbps IEEE802.11 HR DSSS, and the like may be used.

The operation will be explained below.

Figure 4:
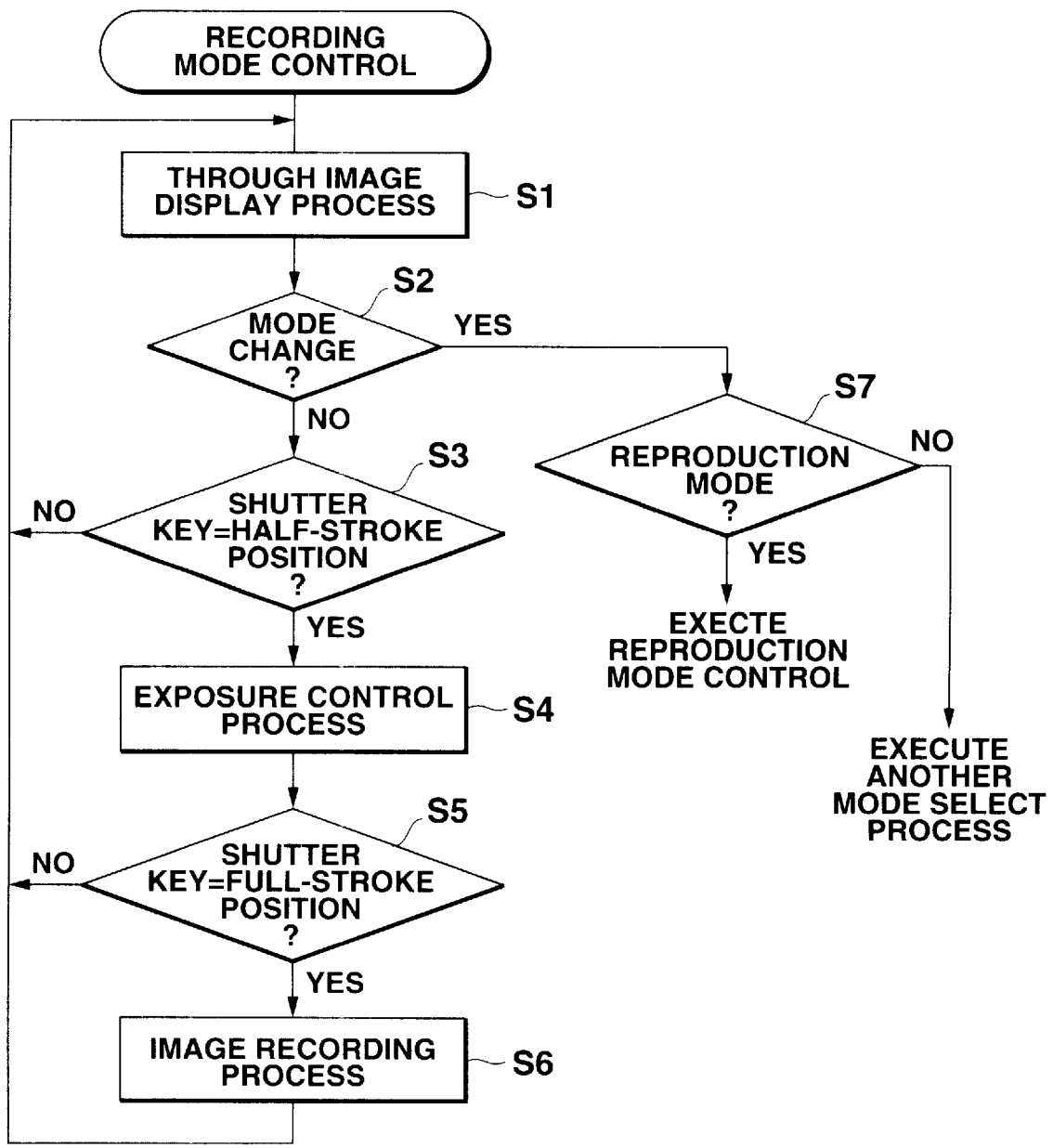
FIG. 4 is a flow chart of a recording mode control program in the electronic still camera of the first embodiment.

FIG. 4 is a flow chart of the control program of the electronic still camera 1, i.e., a schematic flow chart of a program executed by the CPU 24 in the recording mode. This program checks for any mode change in response to a predetermined key operation at the key input unit 25 (S2) while executing a through image display process (S1) for displaying a sensed image on the liquid crystal display 102 as a monitor. If no mode change is detected, the program executes an exposure control process (S4) and image recording process (S6) in response to depression of the shutter key 101 (S3, S5). If a mode change is detected, the program checks if the next mode is a reproduction mode (S7). If the reproduction mode is selected, the program executes "reproduction mode control" shown in FIG. 5; otherwise, it executes another mode select process. Note that the operation of the shutter key 101 is not limited to depression, but may be attained by a touch key, remote controller, computer control, or the like.

Figure 5:
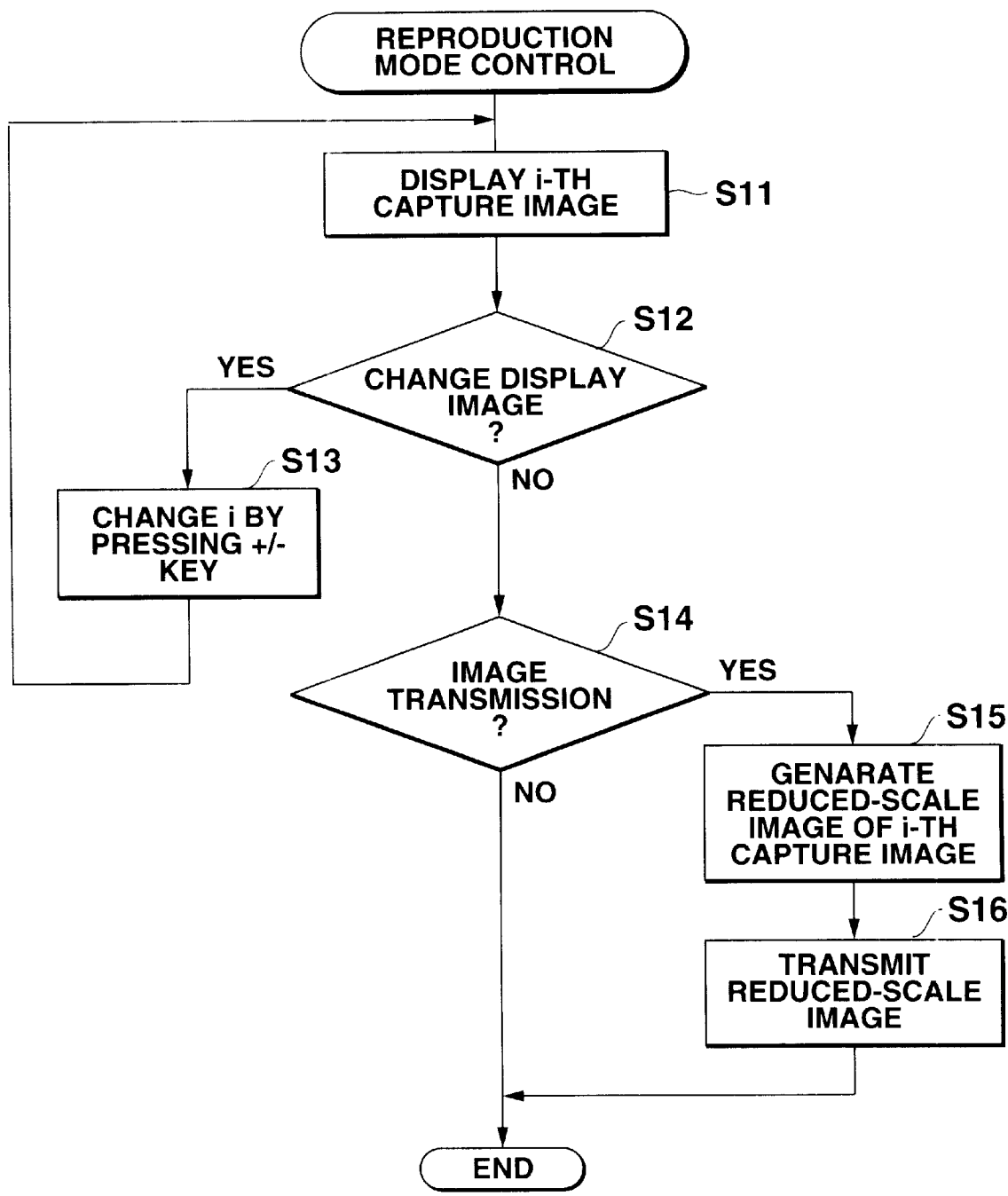
FIG. 5 is a flow chart of a reproduction mode control program in the electronic still camera of the first embodiment.

Referring to FIG. 5, in the "reproduction mode control", the i-th capture image is read out from the flash memory 23, and is expanded by the compression/expansion circuit 21. The expanded image is displayed on the liquid crystal display 102 via the digital video encoder 26 (S11). Note that the initial value of variable i is the number of the latest capture image stored in the flash memory 23, i.e., that of the image which was recorded last.

If the user wants to change the displayed image (YES in step S12), he or she operates, e.g., a plus (+) or minus (−) key to update the value of variable i (S13) to read out the i-th capture image from the flash memory 23 again. The readout image is expanded by the compression/expansion circuit 21, and is displayed on the liquid crystal display 102 via the digital video encoder 26 (S11).

After the user confirms that a required image is displayed, it is checked if the displayed image is to be transmitted (S14). This checking process is implemented by monitoring a predetermined key operation at the key input unit 25. If the image is not to be transmitted (NO in step S14), the program ends; if the image is to be transmitted (YES in step S14), a reduced-scale image (to be also referred to as a thumbnail image hereinafter) of the i-th capture image, i.e., the capture image which is being displayed on the liquid crystal display 102 is generated, and is transmitted to the external apparatus via the communication unit 30, thus ending the program. Note that the size of the reduced-scale image matches the display size of the liquid crystal display 200 of the wristwatch 2, and when the number of pixels of a capture image is, e.g., M×N, the reduction factor assumes a value that can convert M×N into the number of pixels (n×m) of the liquid crystal display 200 of the wristwatch 2.

Figure 6:
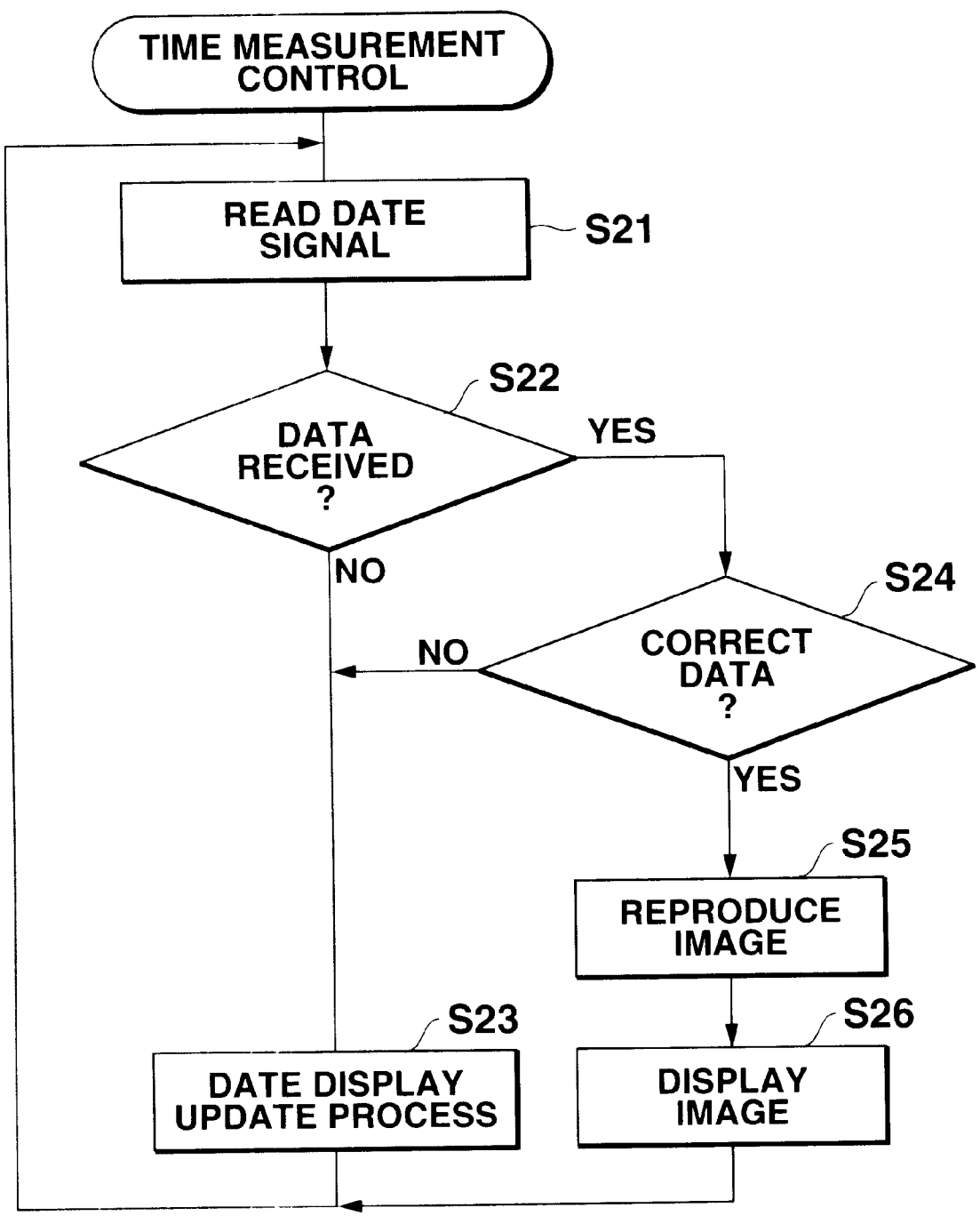
FIG. 6 is a flow chart of a time measurement control program in the wristwatch of the first embodiment.
Figure 7A:
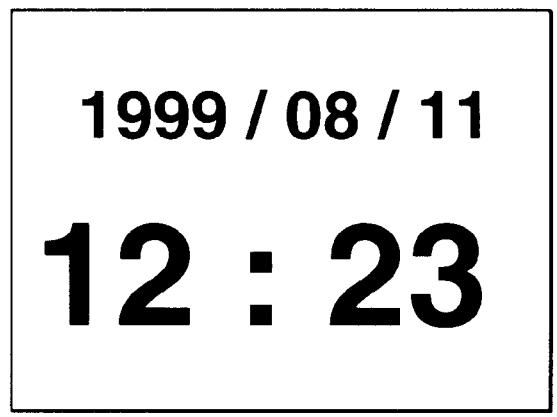
FIGS. 7A and 7B show display examples of the wristwatch in the first embodiment.

FIG. 6 is a schematic flow chart of the time measurement control program executed by the controller 208 of the wristwatch 2. This program reads a date signal from the time measurement circuit 202 (S21), and checks if the communication unit 206 has received data from the electronic still camera 1 (S22). If no data is received (NO in step S22), date display on the liquid crystal display 200 is updated using the date signal read from the time measurement circuit 202 (S23). For example, FIG. 7A shows an example of the date display on the liquid crystal display 200 of the wristwatch 2, which example displays date information "1999/08/11" and time information "12:23".

Figure 7B:
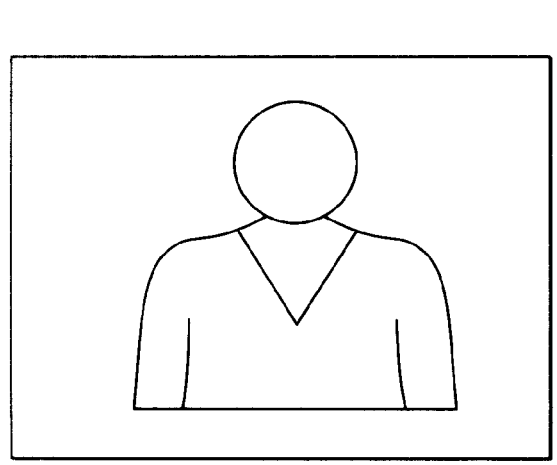

On the other hand, if it is determined in step S22 that data has been received, the program checks if the received data has a correct format (S24). If the received data has a correct format, an image is reproduced from the received data (S25), and the reproduced image is displayed on the liquid crystal display 200 (S26). For example, FIG. 7B shows an example of image display on the liquid crystal display 200 of the wristwatch 2, which examples displays a bust shot of a person.

Another embodiment will be described below.

Figure 8:
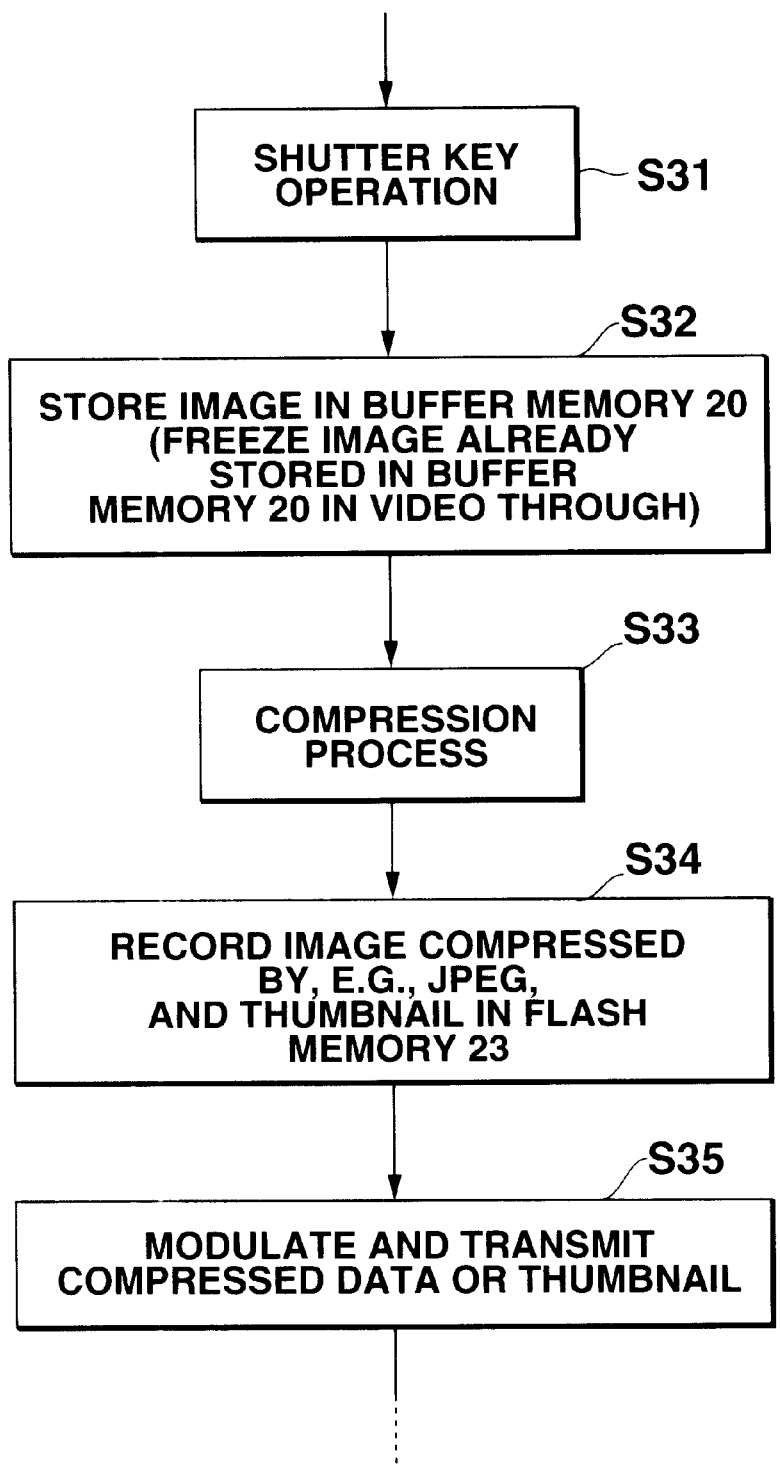
FIG. 8 is a flow chart executed upon operation of a shutter key in the electronic still camera of the first embodiment.

FIG. 8 is a flow chart showing a process for transferring an image taken by the electronic still camera 1 to the wristwatch 2 in response to operation of the shutter key 101. In this flow chart, upon detecting operation of the shutter key 101 (S31), an image sensing process is done. More specifically, an image sensed by the CCD 13 undergoes a predetermined process, and is stored in the buffer memory 20 (in a video through process, a display process is done while repetitively storing an image in the buffer memory 20) (S32). The stored image is compressed (S33), and the compressed image is recorded on the flash memory 23 (S34). In this case, a pair of an image compressed by JPEG and its thumbnail image are recorded. At the same time, the compressed image or thumbnail image is modulated and transmitted (S35).

The image to be modulated may be read out once it is written in the flash memory 23 or may directly undergo a modulation/transmission process parallel to a write in the flash memory 23 or without any write.

Figure 9:
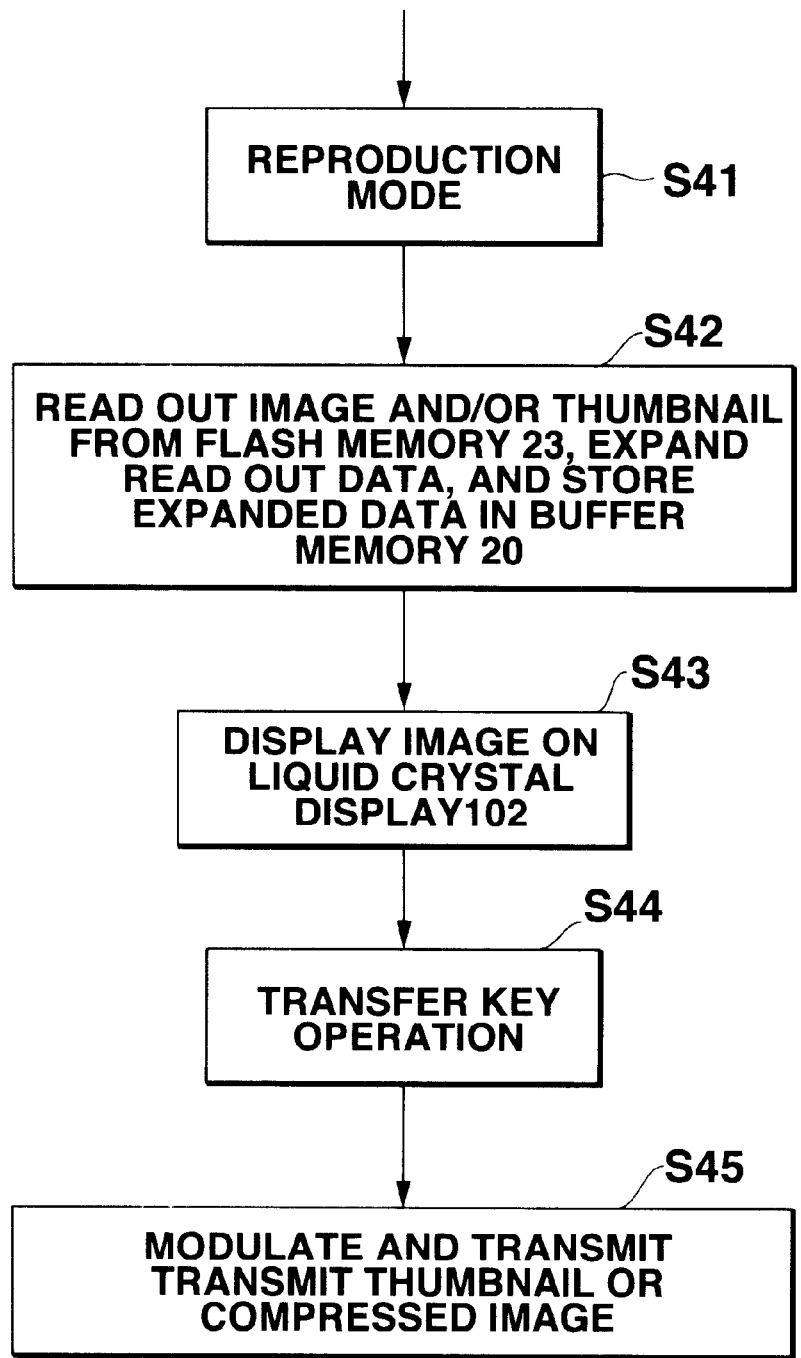
FIG. 9 is a flow chart executed upon operation of a transfer key in the electronic still camera of the first embodiment.

FIG. 9 is a flow chart showing a transfer process executed in response to operation of the transfer key 105 in place of the image transfer process in response to the shutter key 101. In this flow chart, first the reproduction mode is set (S41). An image recorded on the flash memory 23 (normally, the image taken last) is read out and expanded, and is read out onto the buffer memory 20 (S42). In this case, a thumbnail may be read out together or before that image. The readout image is displayed on the liquid crystal display 102 (S43). When the user wants to send the image to the wristwatch 2, he or she operates the transfer key 105 (S44). Then, the compressed image or thumbnail image is modulated and transmitted under the control of the CPU 24 (S45).

Figure 10:
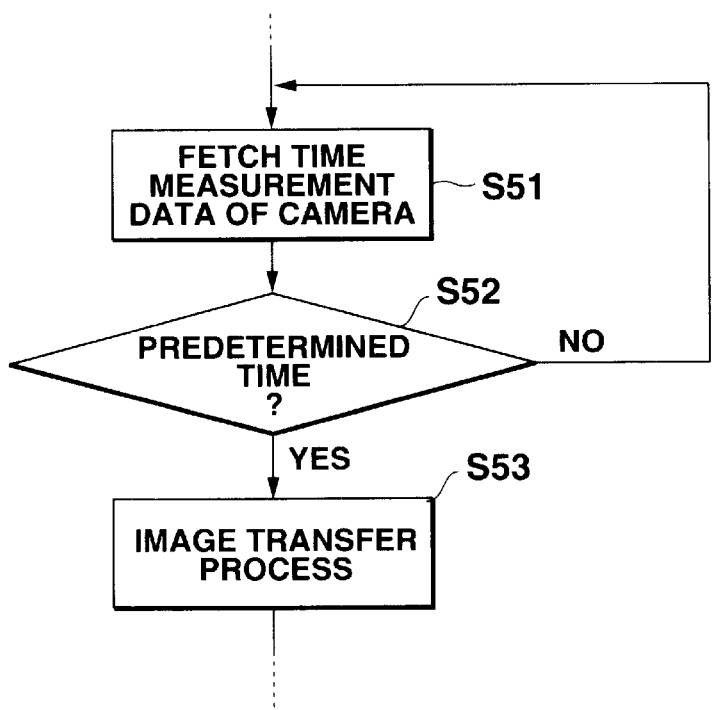
FIG. 10 is a flow chart showing an image transfer process based on the measured time in the electronic still camera of the first embodiment.

FIG. 10 is a flow chart showing the process for transferring an image in accordance with time data measured by the timepiece circuit 40 of the electronic still camera 1 in place of transferring an image in response to a manual key operation of, e.g., the shutter key 101 or transfer key 105. That is, the time data measured by the timepiece circuit 40 of the electronic still camera 1 is fetched (S51). If the time data indicates a specific date/time such as noon or the like (S52), an image is automatically transmitted (S53).

Figure 11:
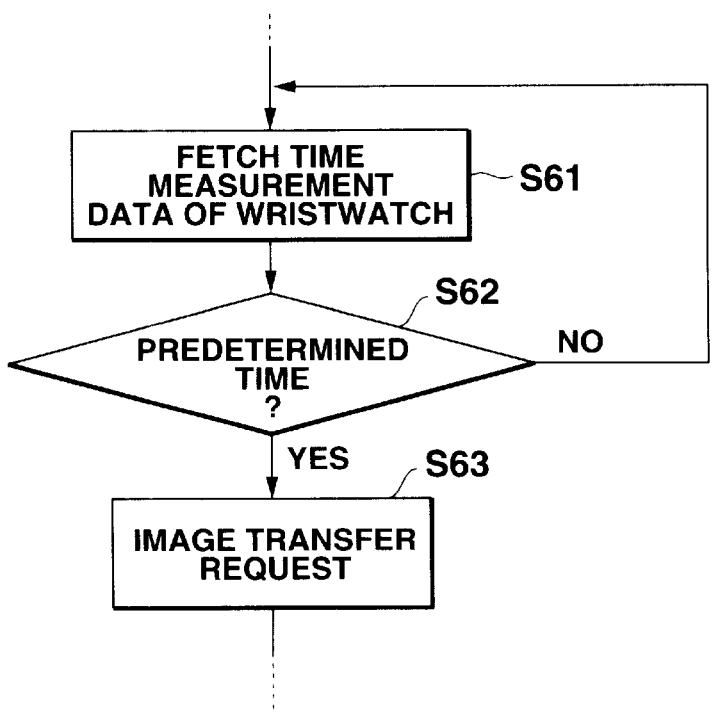
FIG. 11 is a flow chart showing an image transfer request process based on the measured time in the wristwatch of the first embodiment.

FIG. 11 is a flow chart showing the process for transmitting a transfer request signal to the electronic still camera 1 using time data measured by the time measurement circuit 202 of the wristwatch 2, in place of the timepiece circuit 40 of the camera. That is, time data measured by the time measurement circuit 202 of the wristwatch 2 is fetched (S61). If the time data indicates a specific date/time such as on the hour or the like (S62), an image transfer request is automatically output to the electronic still camera 1 (S63). Upon receiving the transfer request signal, the electronic still camera 1 executes an image transfer process, and the wristwatch 2 receives the transferred image.

Figure 12:
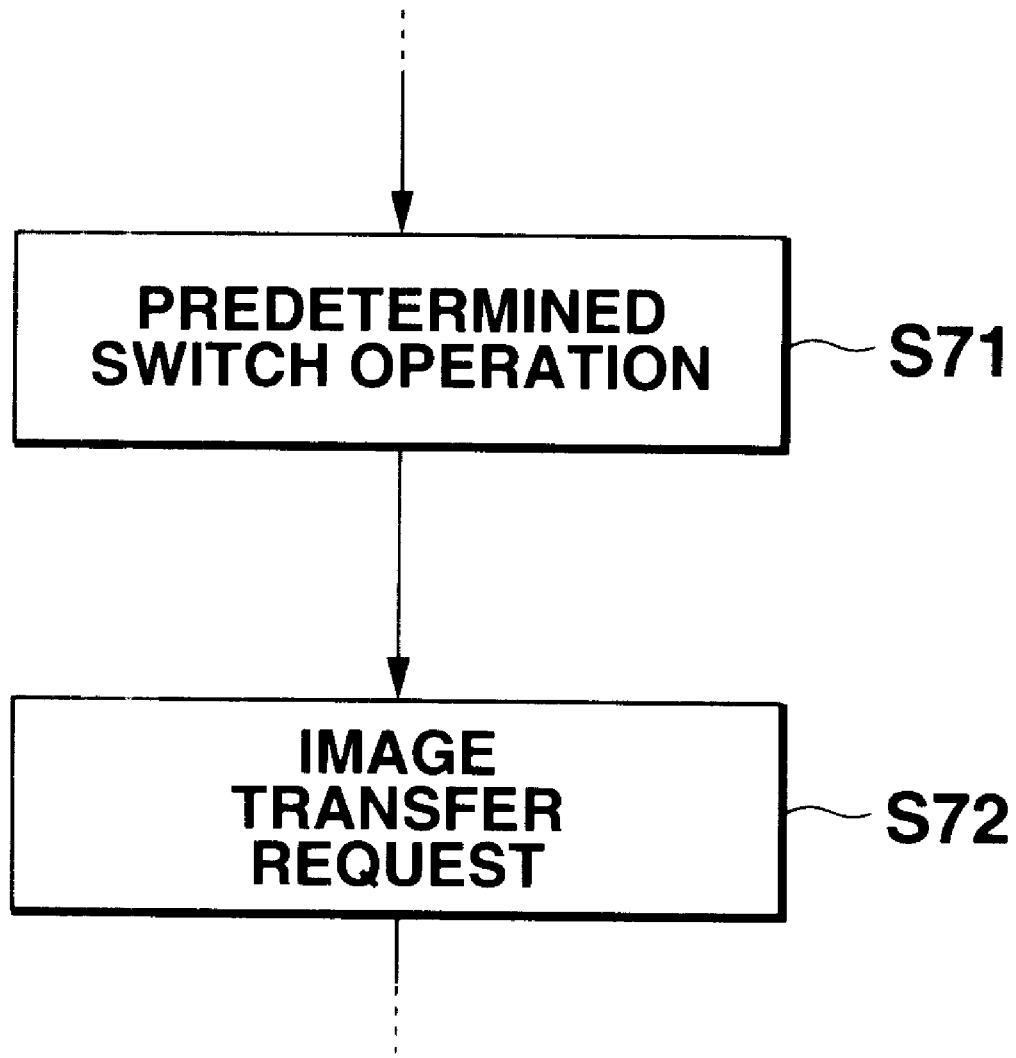
FIG. 12 is a flow chart showing an image transfer request process in response to predetermined switch operation in the wristwatch of the first embodiment.

Alternatively, as shown in FIG. 12, upon depression of a predetermined switch on the wristwatch 2 (S71), an image transfer request signal may be transmitted to the electronic still camera 1 (S72).

As described above, according to the electronic still camera 1 and wristwatch 2 of the first embodiment, during reproduction of an arbitrary image on the electronic still camera 1, reduced-scale image data of that reproduced image can be sent by radio. In addition, when the wristwatch 2 is present within the access area of a radio wave, it can receive that reduced-scale image data and display the data on its liquid crystal display 200.

Therefore, the camera and wristwatch can be systematically used as follows, and new applications of the wristwatch with the display device can be explored.

Figure 13A:
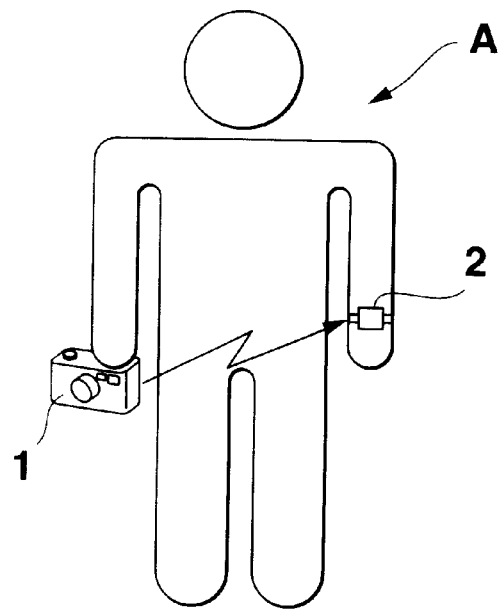
FIGS. 13A and 13B show use examples of the system of the first embodiment.

(A) In FIG. 13A, person A carries both the electronic still camera 1 and wristwatch 2. Person A can reproduce and confirm an image taken by the electronic still camera 1 on its liquid crystal display 102. Also, by sending the reproduced image, person A can confirm that image on the liquid crystal display 200 of the wristwatch 2. According to this use method, the liquid crystal display 200 of the wristwatch 2 can be used in place of the monitor screen (liquid crystal display 102) of the electronic still camera 1.

Figure 13B:
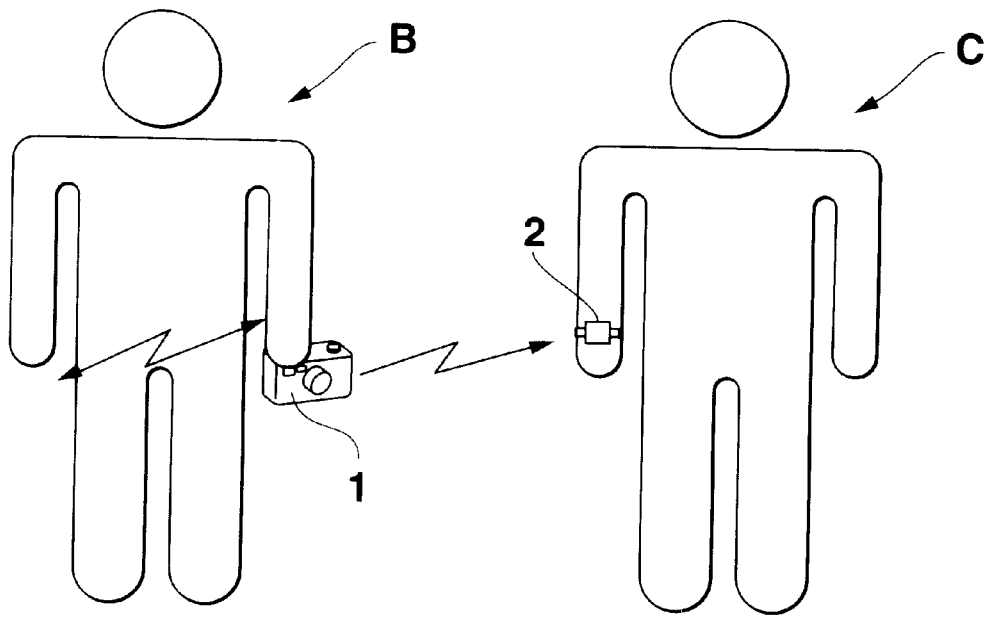

(B) In FIG. 13B, person B carries the electronic still camera 1, and person C carries (wears) the wristwatch 2. When persons B and C are located within the access range of a radio wave, image data sent from the electronic still camera 1 can be received by the wristwatch 2 of person C. According to this use method, an image can be easily transferred between persons B and C. Even if persons B and C do not know each other, an image can be transferred between them. The system of this embodiment can be used, for example, in an encounter game on a crowded street.

In the above embodiment, the electronic still camera has been exemplified, but the present invention is not limited to such specific apparatus. An image recording apparatus that can electronically record an image can be used, and the present invention can be applied to a movie camera, as described above.

Various modifications of the above embodiment can be made within the scope of the present invention. For example, an image to be sent to the wristwatch may be image data compressed by JPEG. In this case, the wristwatch 2 requires a JPEG expansion function.

An image to be transferred to the wristwatch 2 need not always be a set of image data. For example, image data to be transferred may be segmented into a plurality of data, and may be transferred in units of segmented data. Note that image data may be segmented by a fixed length from the head of image data, or may be segmented in units of pixels. For example, the two-dimensional plane of the image may be segmented into a plurality of regions (or in units of scan lines), and image data may be transferred in units of pixel data included in the segmented regions. Alternatively, an image may be segmented into frequency components, and may be transferred in units of segmented frequency component data. An image may be reproduced simultaneously after all transferred data are received or sequentially every time each transferred data is received.

Furthermore, an image to be transferred to the wristwatch 2 may be a through image which is displayed on the liquid crystal display 102 of the electronic still camera 1 at predetermined periods (normally, 1/30-sec periods). In this case, a through image may be directly used as the image to be transferred to the wristwatch 2, but an intermittent image of some through images may be used as the image to be transferred.

Moreover, the electronic still camera 1 may be operated from the wristwatch 2. For example, when the zoom, exposure, focusing, image quality adjustment, field angle adjustment, ON/OFF of the continuous shot function, and the like of the electronic still camera 1 can be controlled from the wristwatch 2, the wristwatch 2 can be preferably used as a remote controller of the electronic still camera 1. Furthermore, the camera and wristwatch with such function can be applied to a personal LAN and network game.

(Second Embodiment)

Figure 14:
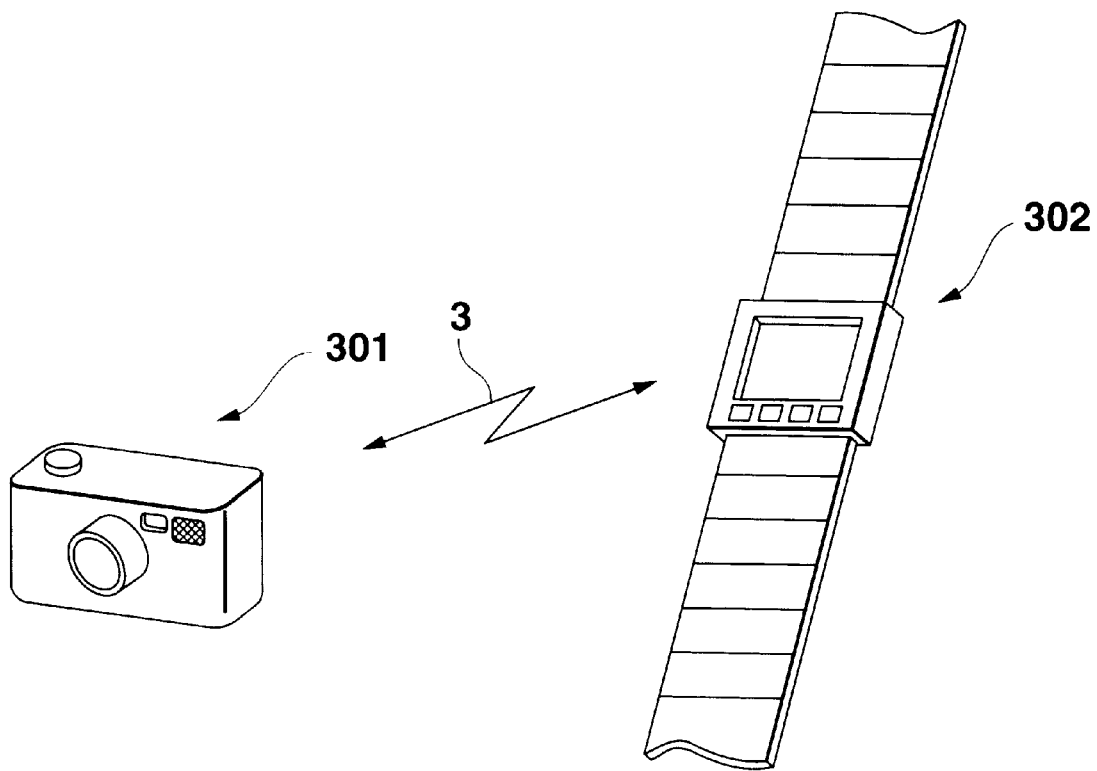
FIG. 14 is a view showing the arrangement of an information recording system according to the second embodiment of the present invention.

FIG. 14 shows the arrangement of an information recording system according to the second embodiment. Reference numeral 301 denotes a so-called electronic still camera such as a digital camera or the like that electronically records images; and 302, a wristwatch. As can be understood from FIG. 14, these electronic still camera 301 and wristwatch 302 are housed in independent, dedicated bodies (corresponding to first and second housings cited in the gist of the invention).

The electronic still camera 301 corresponds to a camera apparatus, image recording means, or image recording apparatus cited in the gist of the invention, and the wristwatch 302 corresponds to a timepiece apparatus, information acquisition means, or information acquisition apparatus. Note that the scope of the present invention is not limited to such electronic still camera (that electronically records images). The present invention can also be applied to so-called silver halide cameras such as APS cameras that physically record images on silver halide films.

As will be described later, these electronic still camera 301 and wristwatch 302 respectively have a wireless communication function by a radio wave 3. For example, the electronic still camera 301 sends a date acquisition request upon recording an image, receives date information sent from the wristwatch 302 in response to the request, and makes date management using the received date information.

Figure 15:
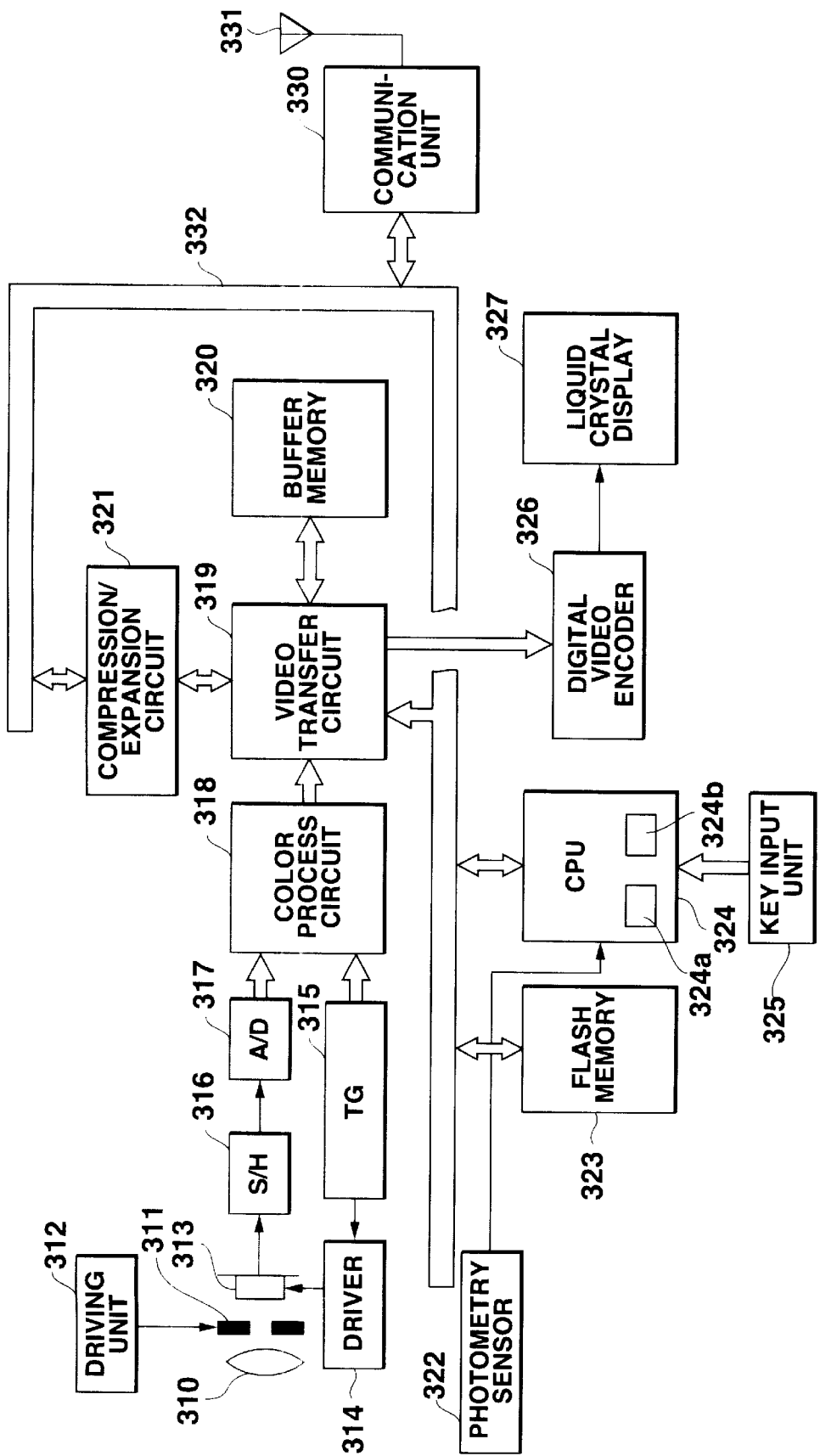
FIG. 15 is a block diagram of an electronic still camera of the second embodiment.

FIG. 15 is a block diagram of the electronic still camera 301. Referring to FIG. 15, reference numeral 310 denotes a photographing lens; 311, a stop mechanism provided on the optical axis of the photographing lens 310; 312, a driving unit for the stop mechanism 311; 313, an image sensor (to be referred to as a "CCD" hereinafter) for receiving light that has passed through the stop mechanism 311 and outputting a sensed image signal of an object; 314, a driver for driving the CCD 313; 315, a timing generator (abbreviation: TG) for generating various timing signals such as a signal for controlling a charge accumulation time (image sensing time) of the CCD 313, and the like; 316, a sample & hold circuit (abbreviation: S/H) for sampling the sensed image signal output from the CCD 313, and removing noise; and 317, an analog-to-digital converter (abbreviation: A/D) for converting the noise-removed sensed image signal into a digital signal. Note that the CCD 313 corresponds to image sensing means cited in the gist of the invention.

Reference numeral 318 denotes a color process circuit for generating a composite luminance/color difference signal (to be referred to as an "image signal" hereinafter) based on the output from the A/D 317; 319, a video transfer circuit; 320, a buffer memory for holding an image signal; 321, a compression/expansion circuit for compressing/expanding an image signal using a predetermined coding scheme (generally, JPEG); 322, a photometry sensor for measuring the brightness of an object; and 323, a fixed or detachable flash memory for recording a compressed image signal. The flash memory 323 corresponds to third storage means cited in the gist of the invention.

Reference numeral 324 denotes a CPU which executes a control program stored in a program ROM 324a on a work RAM 324b to implement recording/reproduction control processes of images and various control processes associated with these control processes (one of such processes pertains to recording mode control to be described later). The CPU 324 corresponds to control means, setting means, adding means, or recording control means cited in the gist of the invention, and the work RAM 324b corresponds to second storage means, fifth storage means, or memory cited in the gist of the invention.

Reference numeral 325 denotes a key input unit for generating a key input signal in response to operation of each of various keys such as a shutter button and the like; 326, a digital video encoder for converting the image signal held in the buffer memory 320 into a signal format suitable for display; 327, a liquid crystal display as an image monitor for displaying a signal output from the digital video encoder 326; 330, a communication unit which exchanges data with an external apparatus (e.g., the wristwatch 2 to be described later) via an antenna 331; and 332, a bus for connecting the individual units. The communication unit 330 corresponds to reception means, data exchange means, wireless transmission means, or wireless reception means cited in the gist of the invention.

The electronic still camera 301 with the above arrangement can be switched between an image recording mode and reproduction mode by a predetermined key operation at the key input unit 325, and the recording mode can be classified into a through mode for converting sensed image signals periodically output from the CCD 313 into those suitable for display, and sequentially displaying the converted signals on the liquid crystal display 327, and a capture mode for recording a required sensed image signal on the flash memory 323 by operating the shutter key.

In the through mode, the CCD 313 located behind the photographing lens 310 is driven by a signal from the driver 314, and photoelectrically converts an object image formed by the photographing lens 310 at given periods to output a signal for one image. This signal is sampled by the S/H 316, and is converted by the A/D 317 into a digital signal. The digital signal is input to the color process circuit 318 to generate an image signal. This image signal is transferred to the buffer memory 320 via the video transfer circuit 319. Upon completion of transfer to the buffer, the image signal is read out by the video transfer circuit 319, and is sent to the liquid crystal display 327 via the digital video encoder 326, thus displaying a through image.

When the angle of the camera is changed in this state, the composition of a through image displayed on the liquid crystal display 327 changes. When the shutter key is pressed to its "half-stroke" position at an appropriate timing (at the timing when a desired composition is obtained) to automatically or manually set the exposure and focus values, and is then pressed to its "full-stroke" position, the camera is switched to the capture mode, and an image signal saved in an image buffer of the buffer memory 320 is frozen to the one at that time, and a through image displayed on the liquid crystal display 327 is also frozen to the one at the same timing. The image signal saved in the image buffer of the buffer memory 320 at that time is sent to the compression/expansion circuit 321 via the video transfer circuit 319, and its luminance and color difference information components are encoded by JPEG in units of 8×8 basic blocks. The encoded image signal is then recorded (captured) on the flash memory 323.

In the reproduction mode, the route from the CCD 313 to the buffer memory 320 is closed, and the latest capture image is read out from the flash memory 323. The readout image is expanded by the compression/expansion circuit 321, and is sent to the image buffer of the buffer memory 320 via the video transfer circuit 319. The data in the image buffer is sent to the liquid crystal display 327 via the video transfer circuit 319 and digital video encoder 326, and is displayed as a reproduced image.

Figure 16:
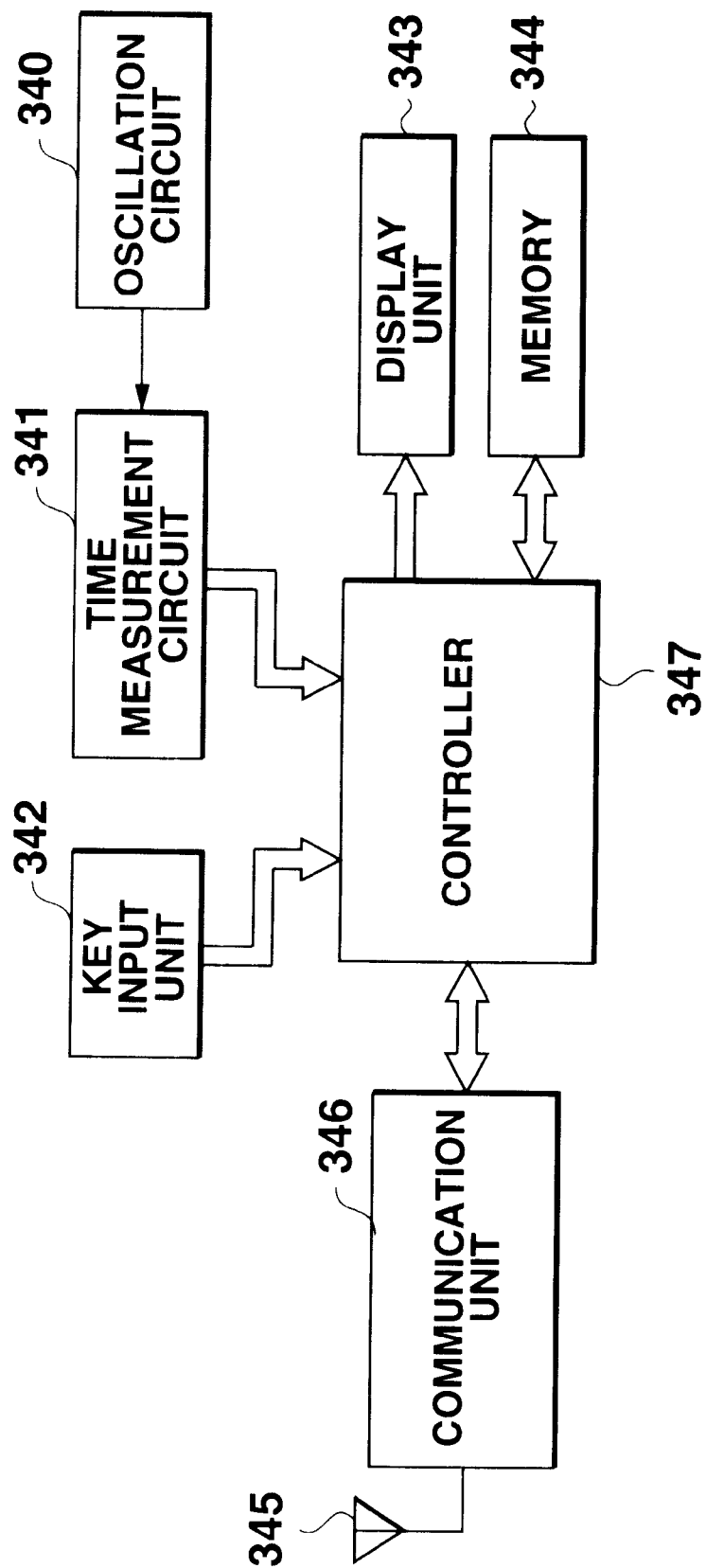
FIG. 16 is a block diagram of a wristwatch of the second embodiment.

FIG. 16 is a block diagram of the wristwatch 302. Referring to FIG. 16, reference numeral 340 denotes an oscillation circuit for generating an accurate frequency signal; 341, a time measurement circuit for generating a date signal which represents the current date and time by frequency-dividing the frequency signal generated by the oscillation circuit 340; 342, a key input unit for generating a key signal for, e.g., time adjustment; 343, a display unit for mainly displaying date information; 344, a memory for storing a control program that implements a time measurement function, and various functions associated with that function; 345, an antenna; 346, a communication unit; and 347, a controller for controlling the entire wristwatch by executing the control program. The time measurement circuit 340 corresponds to time measurement means cited in the gist of the invention, the communication unit 346 corresponds to transmission means, data exchange means, wireless transmission means, or wireless reception means cited in the gist of the invention, and the controller 347 corresponds to transfer control means cited in the gist of the invention.

Note that the communication unit 346 implements wireless data connection using the same protocol as that of the communication unit 330 in the electronic still camera 301. The protocol used is not particularly limited as long as it can realize wireless communications. For example, infrared ray communications (IrDA) as a state-of-the-art near-distance wireless communication technique may be used. However, in consideration of shortcomings of IrDA (vulnerable to obstacles), radio communication techniques free from any directivity are preferably used. In such case, even when one of the electronic still camera 301 and wristwatch 302 is put into a pocket or bag, data connection is not disturbed.

For example, a near-distance, weak transmitting power, mobile communication technique called "Bluetooth" that covers a near distance around 10 m using a radio wave in the 2.45 GHz band and implements a maximum data transfer of 721 kbps (transfer rate=1 Mbps: 2 Mbps will be supported in the next version) in one-to-one connection is a preferable candidate technique. Currently, this technique can be implemented by mounting a compact transceiver module as small as about 0.5 m$^2$ (corresponding to the communication units 330 and 346 in FIGS. 15 and 16).

Figure 17:
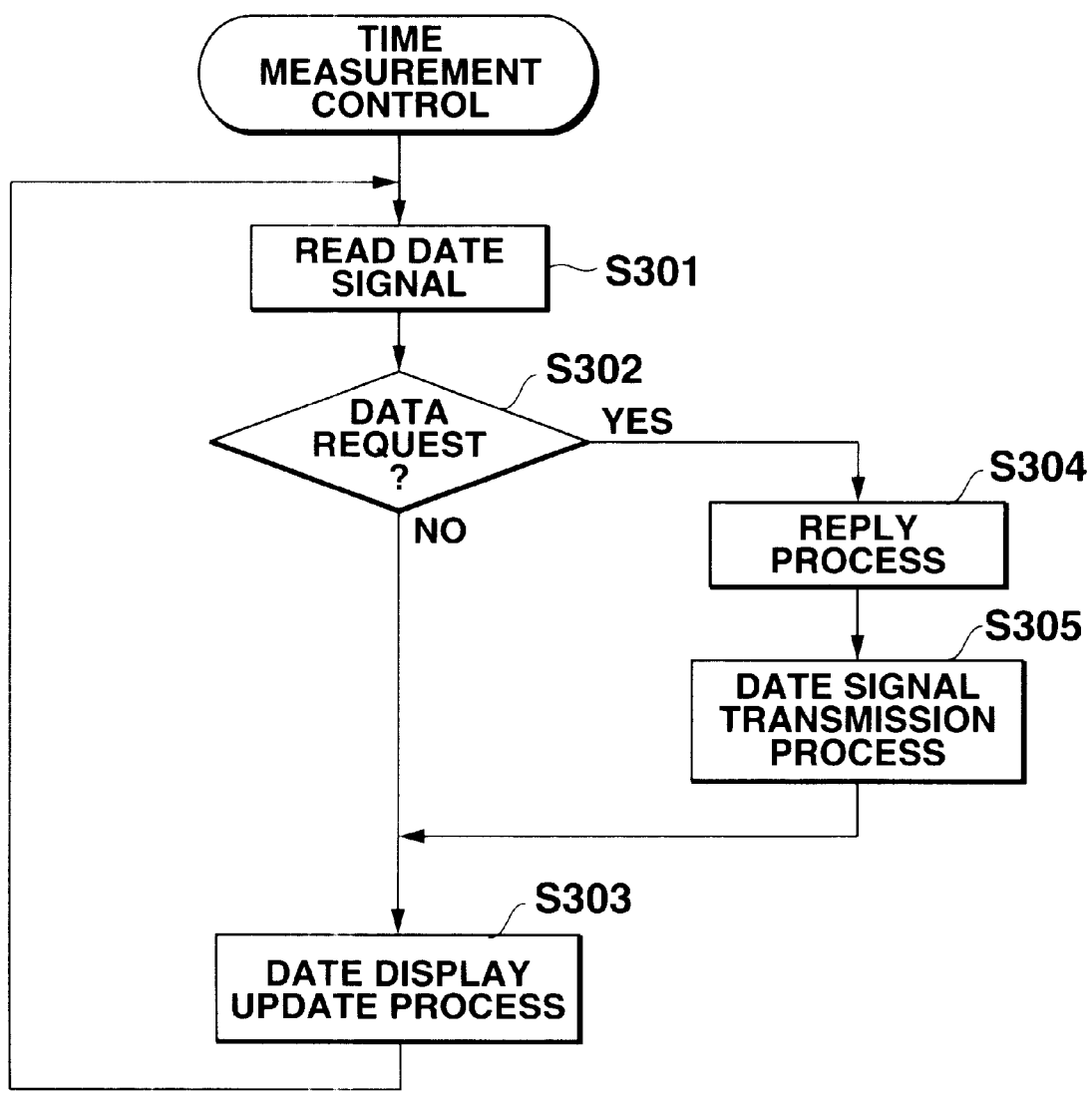
FIG. 17 is a schematic flow chart of a time measurement control program in the second embodiment.

FIG. 17 is a schematic flow chart of a time measurement control program executed by the controller 347 of the wristwatch 302. A date signal is read from the time measurement circuit 341 (S301), and it is checked if the communication unit 346 has received a data request from the electronic still camera 301 (S302). If no data request is received (NO in step S302), date display on the display unit 343 is updated using the date signal read from the time measurement circuit 341 (S303). On the other hand, if the data request has been received (YES in step S302), a reply signal is returned (S304), and the date signal read from the time measurement circuit 341 is sent via the communication unit 346 (S305). After that, date display on the display unit 343 is updated using that date signal (S303).

The aforementioned process repeats itself in correspondence with the display update periods (generally, 1-sec periods) of date information. As a result, the date information display on the display unit 343 is updated at these periods, and the presence/absence of an external data request is periodically checked. If a data request is detected, the latest date signal at that time is transmitted from the antenna 345 via the communication unit 346.

Figure 18:
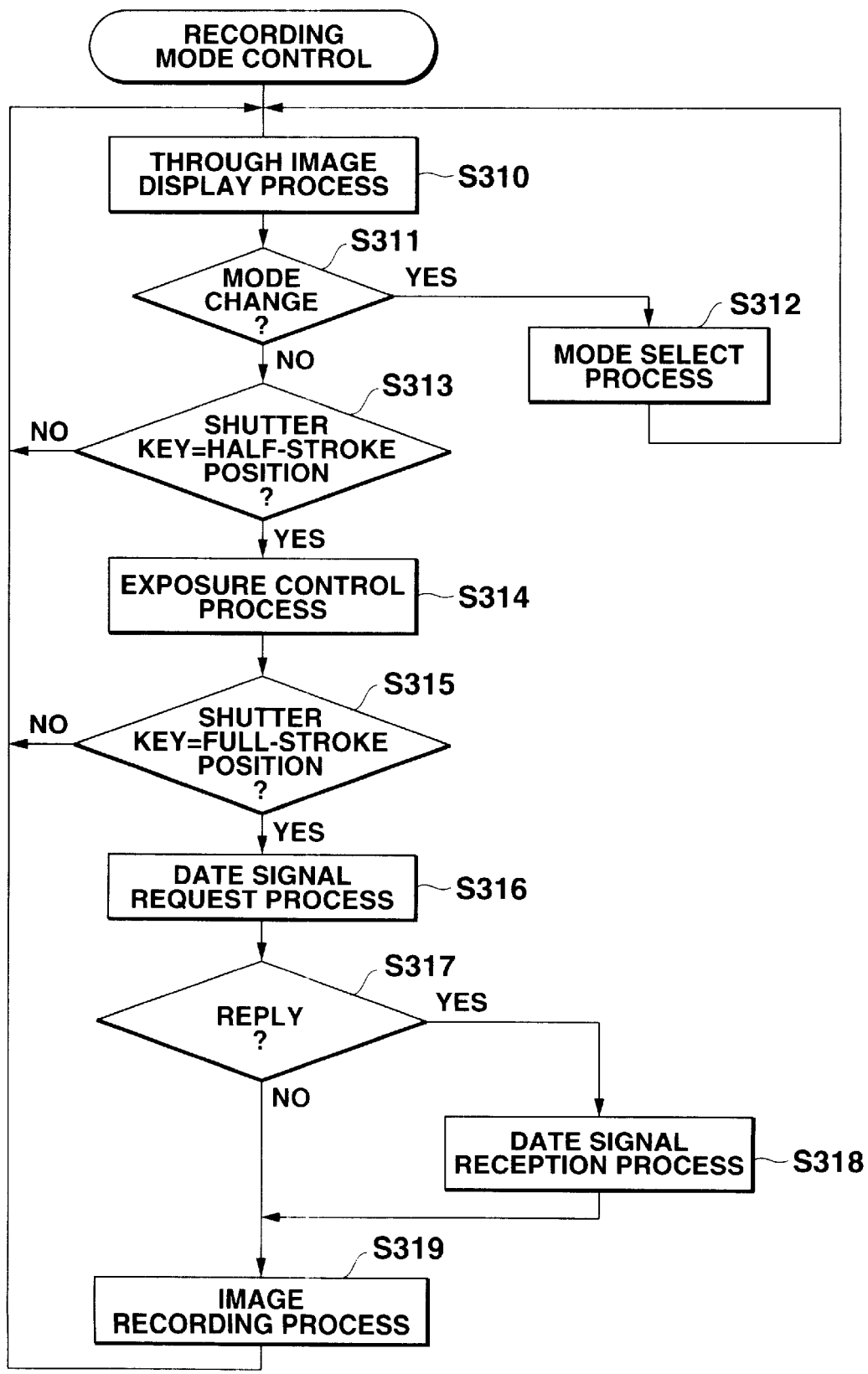
FIG. 18 is a flow chart of a control program of the electronic still camera in the second embodiment.

FIG. 18 is a flow chart of the control program of the electronic still camera 301, i.e., a schematic flow chart of a program executed by the CPU 324 in the recording mode. This program selects a mode other than the recording mode in response to a predetermined key operation at the key input unit 325 (S311, S312), and executes an exposure control process (S314) and image recording process (S319) in response to depression of the shutter key (S313, S315), while executing a through image display process (S310). Especially, this program includes characteristic processing routines, i.e., a date signal request process (S316) and date information reception process (S318) before the image recording process (S319).

That is, if the full-stroke operation of the shutter key is detected (YES in step S315), a date information request signal is transmitted from the antenna 331 via the communication unit 330. If the aforementioned wristwatch 302 is present within a near-distance range, since the wristwatch 302 returns a reply signal in response to the request signal (see S304 in FIG. 17), it is checked if the reply signal is received (S317). Also, date information sent from the wristwatch 302 after the reply signal (see S305 in FIG. 17) is received, and is temporarily stored in a predetermined area of the work RAM 324b. Then, an image is compressed and recorded on the flash memory 323. In this case, when the date information is saved in the predetermined area of the work RAM 324b, that date information is recorded on the flash memory 323 in association with the image data. The "predetermined area" need not always be an area on the work RAM 324b. For example, a dedicated memory may be prepared, and may be entirely or partially used as that area.

Figure 19:
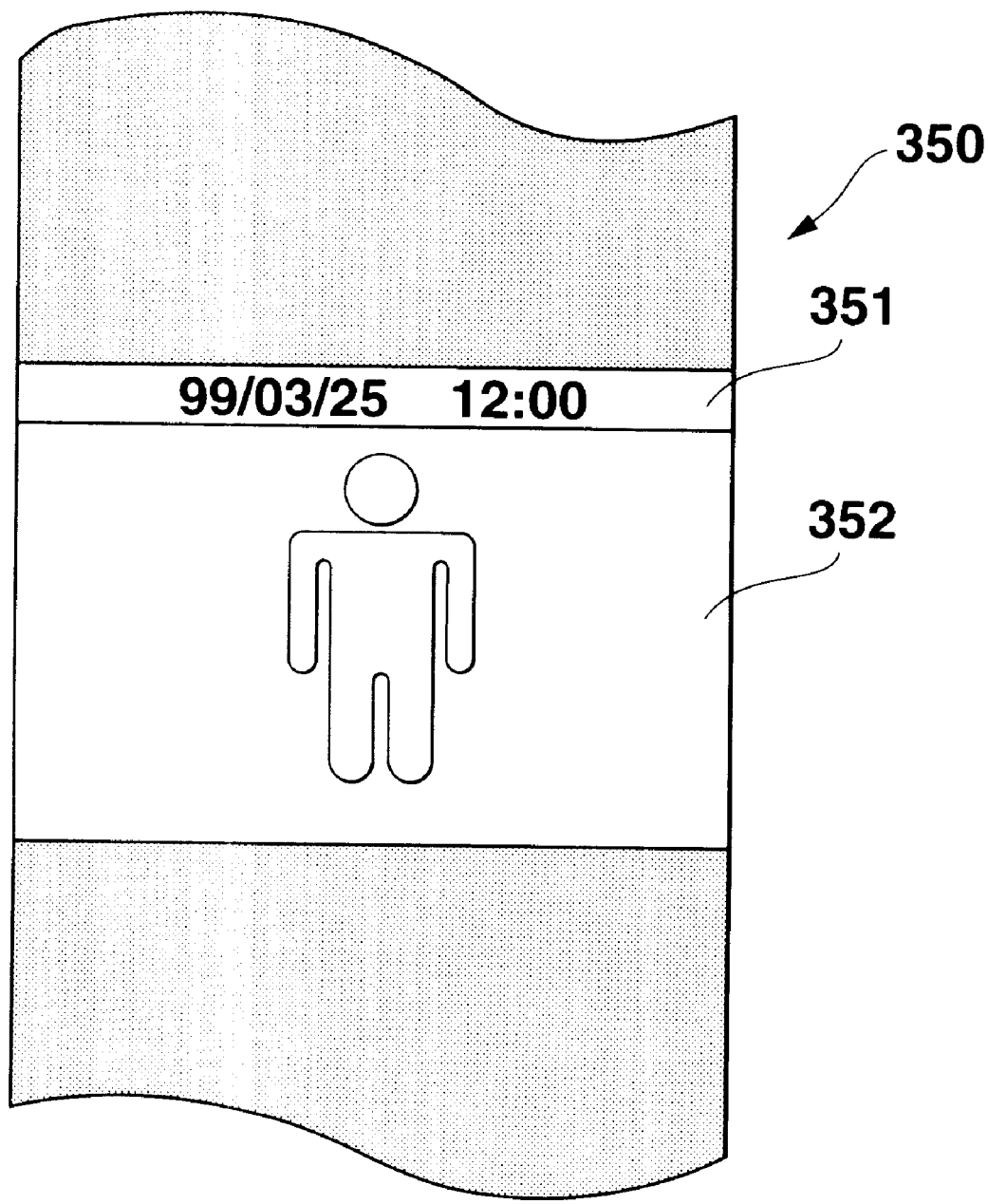
FIG. 19 is a schematic view showing the recording state of a flash memory in the second embodiment.

FIG. 19 shows the recording state of the flash memory 323. An image storage area 350 of the flash memory 323 has a first field 352 for recording compressed image data, and a second field 351 for recording date information indicating the recording date of the image data in that first field 352. Note that the first field 352 may record non-compressed data. Furthermore, the date information recorded in the second field 351 may be data having a display format of Christian Era or Japanese Era, as shown in FIG. 19, or numerical value data which has a past specific date (e.g., 1900/01/01 00:00:00) as an initial value and indicates the time elapsed from that date. The numerical value data is preferable since it is easily converted into the display format of Christian Era or Japanese Era.

Figure 20:
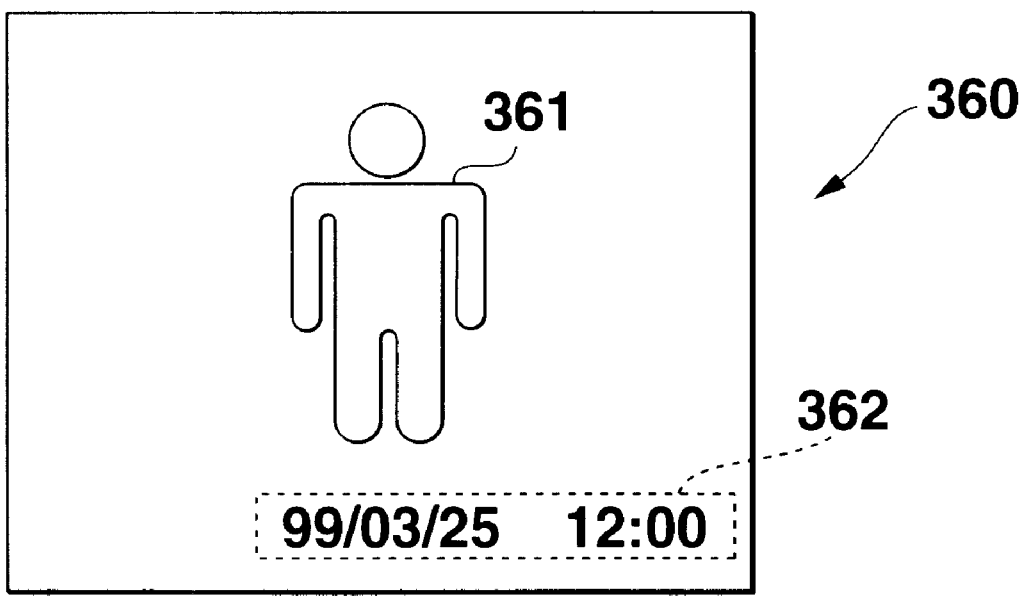
FIG. 20 shows a display example of a liquid crystal display in the second embodiment.

FIG. 20 shows the display state of data which recorded is on the flash memory 323 and is reproduced and displayed on the liquid crystal display 327 of the electronic still camera 301. Referring to FIG. 20, reference numeral 360 denotes a reproduced image; 361, an object image; and 362, date information. The reproduced image 360 that includes the object image 361 other than the date information 362 corresponds to data recorded on the first field 352 of the flash memory 323, and the date information 362 corresponds to data recorded on the second field 351.

As described above, in this embodiment, upon recording an image in the electronic still camera 301, the camera 301 transmits a date signal request signal to the nearby wristwatch 302, receives a date signal transmitted from the wristwatch 302, and records it as data representing the recording date of that image at the same time. Since the date information of the wristwatch 302 has high reliability, the electronic still camera 301 of this embodiment, which can use such highly reliable date information as the recording date of the image can greatly improve the reliability of the recording date.

Note that the electronic still camera 301 of this embodiment may have a time measurement function. When the user does not wear the aforementioned wristwatch 302 or another user who wears that wristwatch is not located within a near-distance range, the photographing date can be recorded using the internal time measurement function, and the date adjustment of the internal time measurement function can use the date information from the wristwatch 302.

The above embodiment has exemplified an electronic still camera, but the present invention is not limited to this. An image recording apparatus having a photographing date recording function can be used, and cameras that use silver halide films such as APS cameras may be used, as described above. Furthermore, the present invention can be applied to movie cameras.

In the above description, date information acquired by another apparatus (wristwatch 302 in the above embodiment) is transferred to the image recording apparatus. However, the information to be transferred is not limited to such specific information. Any other kinds of information required for our daily life or specific action may be used. For example, navigation information such as the current location, direction, and the like, or weather information such as temperature, humidity, and the like may be used. The navigation information can be obtained by building in sensors such as a compass, GPS (Global Positioning System), and the like into the wristwatch 302, and the weather information can be obtained by building in a temperature sensor, and the like into the wristwatch 302. In either case, effective information such as navigation information, weather information, or the like can be transferred to and recorded by the image recording apparatus together with an image, and an information recording system which is preferably carried on, e.g., a trip or mountain-climbing can be implemented.

In the above description, an information recording system that exclusively uses the electronic still camera 301 and wristwatch 302 has been exemplified. However, the scope of the present invention is not limited to such specific example, and the present invention can be applied to variously modified systems.

For example, if a system that mainly includes a camera is called a "camera system", the camera system according to the idea of the present invention is constructed by a timepiece apparatus (see the block diagram of the wristwatch 302 in FIG. 16) which comprises at least time measurement means (see the time measurement circuit 341 in FIG. 16) and measures the current time, and a camera apparatus (see the block diagram of the electronic still camera 301 in FIG. 15) which has image sensing means (see the CCD 313 in FIG. 15), the timepiece apparatus has at least transmission means (see the communication unit 346 in FIG. 16) that transmits data of the measured time or date information (see the date signal read in step S301 in FIG. 17) to the camera apparatus, and the camera apparatus has at least reception means (see the communication unit 330 in FIG. 15) that receives the data transmitted from the transmission means.

The timepiece apparatus may have sensor means (e.g., a GPS sensor), and transmission means (see the communication unit 346 in FIG. 16) for transmitting data acquired by the sensor means or data generated based on the acquired data to the camera apparatus, and the camera apparatus may have reception means (see the communication unit 330 in FIG. 15) for receiving the data transmitted from the transmission means.

The timepiece apparatus may be a wristwatch, the camera apparatus may be an apparatus which is carried by a person who wears the wristwatch on his or her wrist, and the transmission means may have weak transmitting power for near-distance (e.g., an apparatus according to the aforementioned mobile communication technique called "Bluetooth").

The transmission means (see the communication unit 346 in FIG. 16) of the timepiece apparatus may transmit in response to predetermined operation (e.g., manual button operation).

The transmission means (see the communication unit 346 in FIG. 16) of the timepiece apparatus may automatically transmit at a predetermined timing (date or time).

As the information recording system, not only data transmission from the wristwatch 302 to the electronic still camera 301 (or a silver halide camera or movie camera) but also that from both the wristwatch 302 and electronic still camera 301 (or a silver halide camera or movie camera) to a printing apparatus (printer apparatus) may be done. In such case, transmission means (see the communication unit 330 in FIG. 15) can be provided to the electronic still camera 301 (or a silver halide camera or movie camera), and reception means (corresponding to the communication unit 330 in FIG. 15; a reception function alone) can be provided to the printer apparatus. The body (corresponding to a third housing cited in the gist of the invention) of the printer apparatus (not shown) is independent from those of the wristwatch and camera apparatus.

(Third Embodiment)
<Link Arrangement for Camera and Wristwatch According to Third Embodiment>

Figure 21:
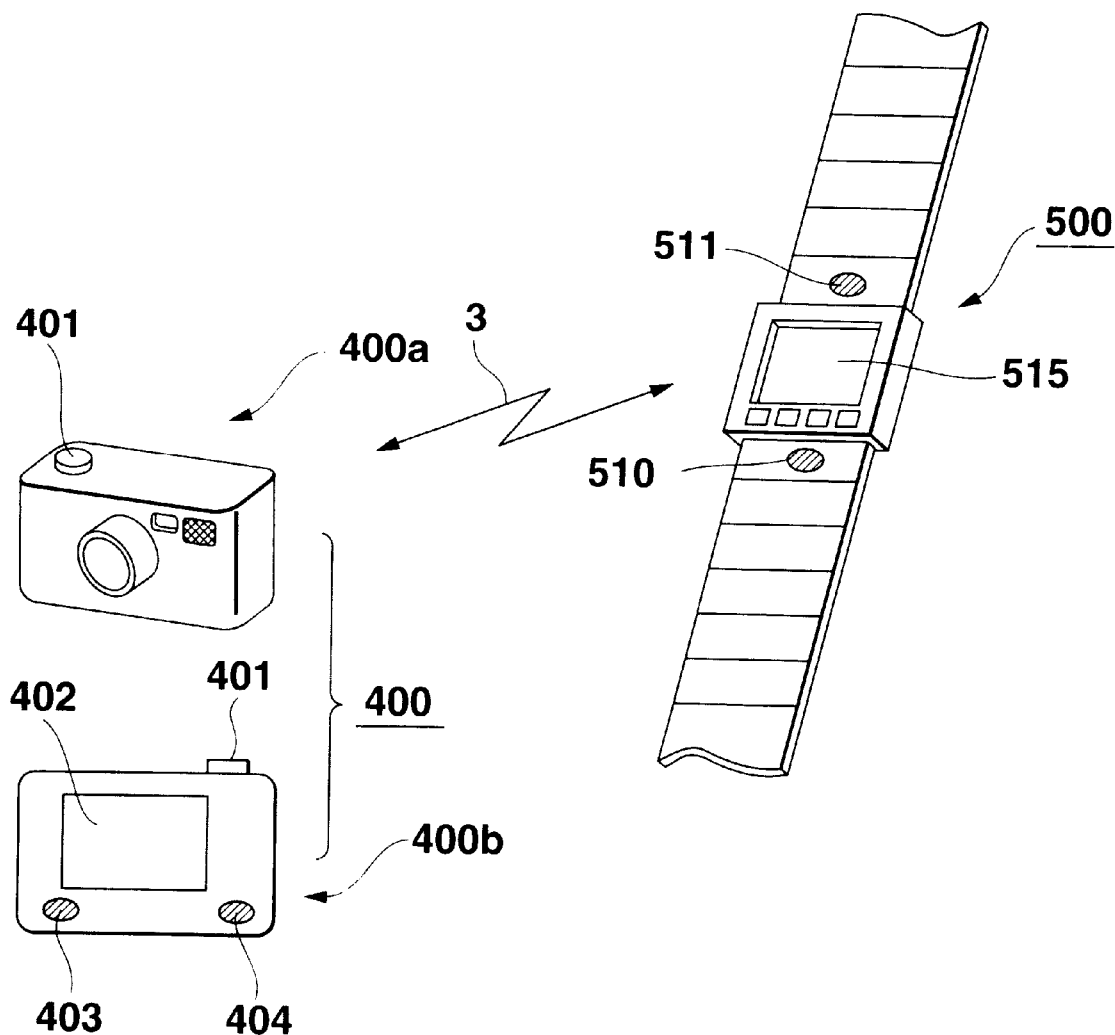
FIG. 21 is a view showing the system arrangement according to the third embodiment of the present invention.

FIG. 21 shows the arrangement of a link system for a camera and wristwatch according to this embodiment. Reference numeral 400 denotes a so-called electronic still camera such as a digital camera that electronically records images; 400a, a front perspective view of the camera 400; and 400b, a rear view of the camera 400. Reference numeral 401 denotes a shutter key; 402, a liquid crystal display; 403, a microphone for inputting voice; and 404, a loudspeaker for outputting voice. Note that the loudspeaker can be a detachable earphone or headphone, and the microphone can be a detachable one. Reference numeral 500 denotes a wristwatch; 515, a liquid crystal display of the wristwatch; 510, a microphone for inputting voice; and 511, a loudspeaker for outputting voice.

As can be seen from the following description, the electronic still camera 400 and wristwatch 500 respectively have a wireless communication function by a radio wave 3. For example, image information recorded by the electronic still camera 400 can be sent to the wristwatch 500, and can be displayed on the liquid crystal display 515 of the wristwatch 500. Also, a transmission function from the wristwatch 500 to the electronic still camera 400 is available. A transmission pattern from the electronic still camera 400 to the wristwatch 1 includes not only a one-to-one transmission pattern for transmitting single image information to one wristwatch 500 only once, but also a pattern for successively or simultaneously transmitting identical image information to a plurality of wristwatches.

As will be described later, a detailed description of a communication scheme will be omitted since a known communication scheme can be used. Also, an antenna of the electronic still camera 400 is not shown in FIG. 21. One-way communications from the electronic still camera 400 side may be made, or the wristwatch 500 may send back a reply signal to form a link. Furthermore, a wireless LAN may be built. Moreover, infrared ray communications may be used although they suffer a directivity problem.

<Arrangement of Electronic Still Camera in Third Embodiment>

Figure 22:
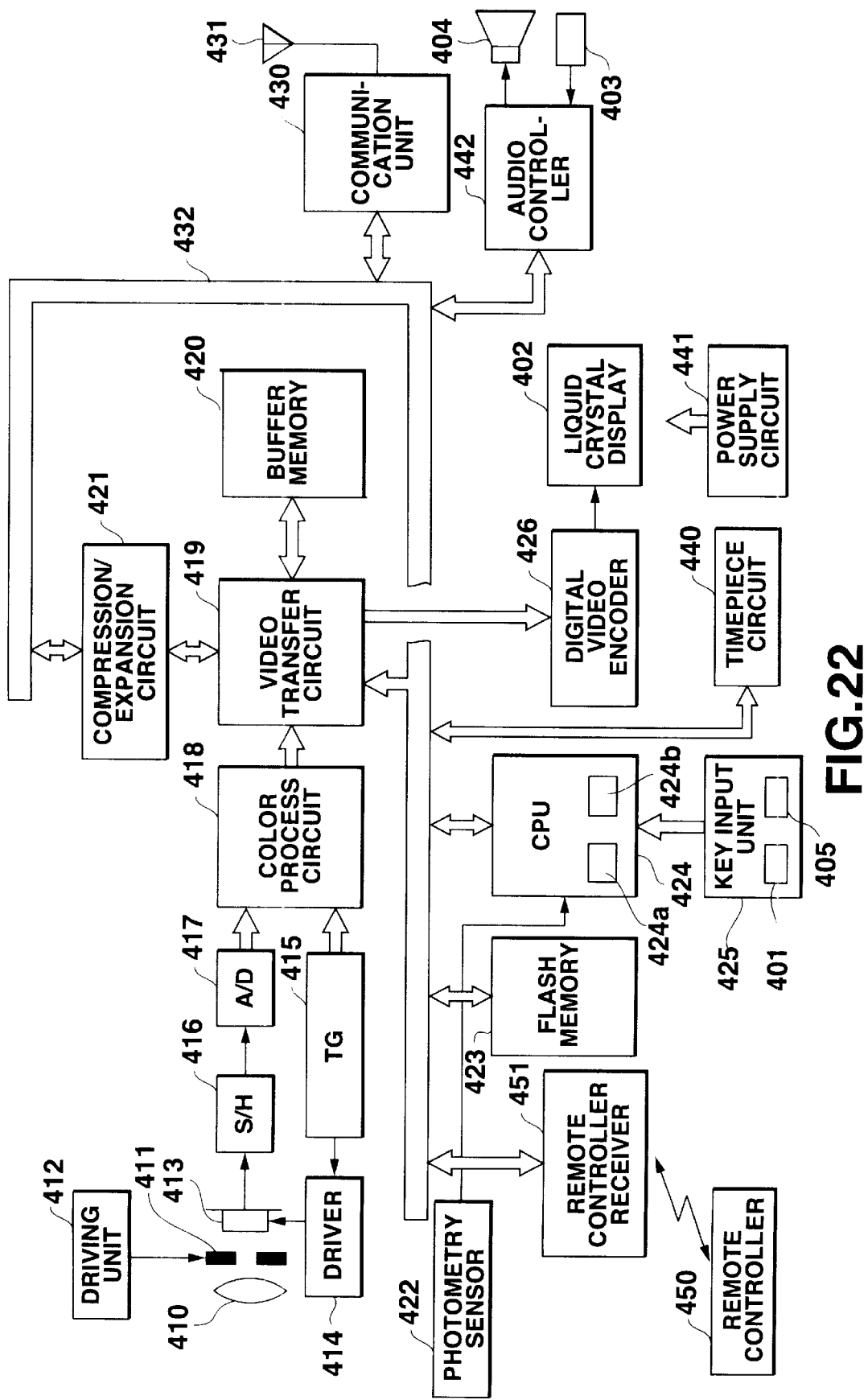
FIG. 22 is a block diagram of an electronic still camera in the third embodiment.

FIG. 22 is a block diagram of the electronic still camera 400. Referring to FIG. 22, reference numeral 410 denotes a photographing lens; 411, a stop mechanism provided on the optical axis of the photographing lens 410; 412, a driving unit for the stop mechanism 411; 413, an image sensing element (to be referred to as a "CCD" hereinafter) for receiving light that has passed through the stop mechanism 411 and outputting a sensed image signal of an object; 414, a driver for driving the CCD 413; 415, a timing generator (abbreviation: TG) for generating various timing signals such as a signal for controlling the charge accumulation time (image sensing time) of the CCD 413, and the like; 416, a sample & hold circuit (abbreviation: S/H) for sampling the sensed image signal output from the CCD 413, and removing noise; and 417, an analog-to-digital converter (abbreviation: A/D) for converting the noise-removed sensed image signal into a digital signal. Note that the image sensing element (image sensor) is not limited to a CCD, but may be other elements such as a C-MOS, image sensing tube, and the like.

Reference numeral 418 denotes a color process circuit for generating a composite luminance/color difference signal (to be referred to as an "image signal" hereinafter) based on the output from the A/D 417; 419, a video transfer circuit; 420, a buffer memory for holding an image signal; 421, a compression/expansion circuit for compressing/expanding an image signal using a predetermined coding scheme (generally, JPEG); 422, a photometry sensor for measuring the brightness of an object; and 423, a fixed or detachable flash memory for recording a compressed image signal. The buffer memory 420 has an area for storing image for at least one frame. When the buffer memory 420 has a storage area for a plurality of frames to sequentially store sensed images, and the stored images are compressed later, a continuous shot mode can be implemented. The flash memory 423 can save either a compressed or non-compressed image. The memory 423 can also save a thumbnail. Furthermore, the memory 423 can save audio data.

Reference numeral 424 denotes a CPU which executes a control program stored in a program ROM 424a on a work RAM 424b to implement recording/reproduction control processes of images and various control processes associated with these control processes. The work RAM 424b and buffer memory 420 may use an identical memory, or their roles may be switched.

Reference numeral 425 denotes a key input unit for generating a key input signal in response to operation of each of various keys such as the shutter key 401, transfer key 405, and the like; 426, a digital video encoder for converting the image signal held in the buffer memory 420 into a signal format suitable for display; 402, a liquid crystal display as an image monitor for displaying a signal output from the digital video encoder 426; 430, a communication unit which comprises a modulation circuit for exchanging data with an external apparatus (wristwatch 500) via an antenna 431; and 432, a bus for connecting the individual units.

Reference numeral 440 denotes a timepiece circuit which stores date/time information. A time measurement process is implemented by the CPU 424, and the contents of the timepiece circuit 440 are periodically rewritten by the measured date/time information. Reference numeral 441 denotes a power supply circuit for supplying electric power from a battery and secondary battery to the individual units. Reference numeral 442 denotes an audio controller for receiving voice input from the microphone 403, and outputting voice from the loudspeaker 404.

Reference numeral 450 denotes a remote controller which exchanges signals with a remote controller receiver 451. The remote controller receiver 451 is controlled by the CPU 424. Shutter operation or the like can be attained by operating the remote controller 450.

The electronic still camera 400 with the above arrangement can be switched between an image recording mode and reproduction mode by a predetermined key operation at the key input unit 425, and the recording mode can be classified into a through mode for converting sensed image signals periodically output from the CCD 413 into those suitable for display, and sequentially displaying the converted signals on the liquid crystal display 402, and a capture mode for recording a required sensed image signal on the flash memory 423 by operating the shutter key 401.

<Through Mode in Third Embodiment>

In the through mode, the CCD 413 located behind the photographing lens 410 is driven by a signal from the driver 414, and photoelectrically converts an object image formed by the photographing lens 410 at given periods to output a signal for one image. This signal is sampled by the S/H 416, and is converted by the A/D 417 into a digital signal. The digital signal is input to the color process circuit 418 to generate an image signal. This image signal is transferred to the buffer memory 420 via the video transfer circuit 419. Upon completion of transfer to the buffer, the image signal is read out by the video transfer circuit 419, and is sent to the liquid crystal display 402 via the digital video encoder 426, thus displaying a through image.

<Capture Mode in Third Embodiment>

When the angle of the camera is changed in this state, the composition of a through image displayed on the liquid crystal display 402 changes. When the shutter key is pressed to its "half-stroke" position at an appropriate timing (at the timing when a desired composition is obtained) to automatically or manually set the exposure and focus values, and is then pressed to its "full-stroke" position, the camera is switched to the capture mode, and an image signal saved in an image buffer of the buffer memory 420 is frozen to the one at that time, and a through image displayed on the liquid crystal display 402 is also frozen to the one at the same timing. The image signal saved in the image buffer of the buffer memory 420 at that time is sent to the compression/expansion circuit 421 via the video transfer circuit 419, and its luminance and color difference information components are encoded by JPEG in units of 8×8 basic blocks. The encoded image signal is then recorded (captured) on the flash memory 423.

After the shutter key has been pressed to its "full-stroke" position, voice input from the microphone 403 within a predetermined time is recorded on the flash memory 423 together with the image captured at the "full-stroke" position. Therefore, an audio-recorded image is recorded on the flash memory 423.

<Reproduction Mode in Third Embodiment>

In the reproduction mode, the route from the CCD 413 to the buffer memory 420 is closed, and the latest capture image is read out from the flash memory 423. The readout image is expanded by the compression/expansion circuit 421, and is sent to the image buffer of the buffer memory 420 via the video transfer circuit 419. The data in the image buffer is sent to the liquid crystal display 402 via the video transfer circuit 419 and digital video encoder 426, and is displayed as a reproduced image. At this time, if audio data is stored together with the captured image, reproduced voice is produced from the loudspeaker 404 under the control of the audio controller 442.

The reproduced image can be changed to the next or previous one by operating a predetermined key (for example, a plus (+) key or minus (−) key) of the key input unit 425. Also, the reproduced image can be sent to the external apparatus via the communication unit 430 by operating a predetermined function key.

<Arrangement of Wristwatch in Third Embodiment>

Figure 23:
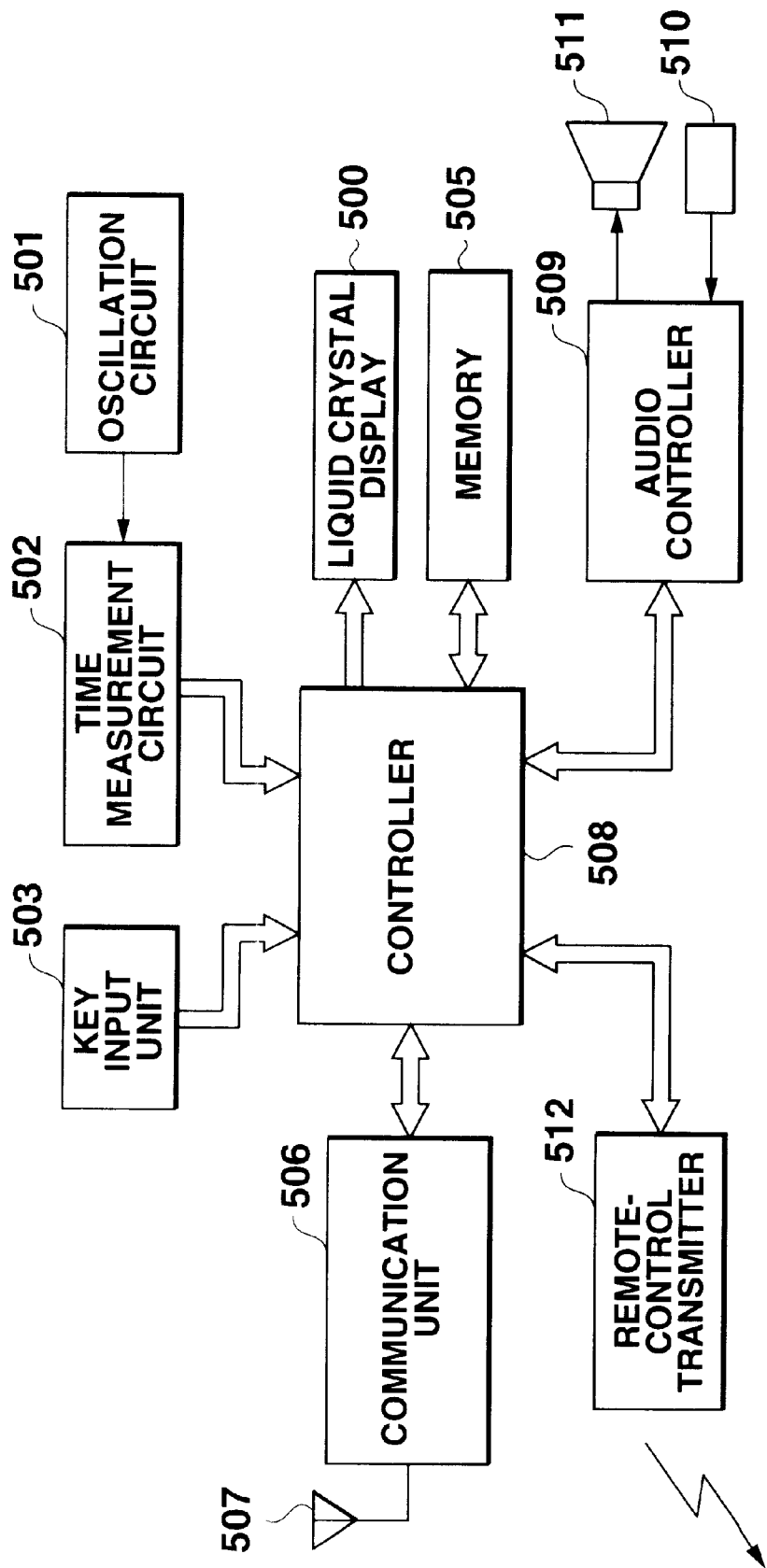
FIG. 23 is a block diagram of a wristwatch in the third embodiment.

FIG. 23 is a block diagram of the wristwatch 500. Referring to FIG. 23, reference numeral 501 denotes an oscillation circuit for generating an accurate frequency signal; 502, a time measurement circuit for generating a date signal which represents the current date and time by frequency-dividing the frequency signal generated by the oscillation circuit 501; 503, a key input unit for generating a key signal for, e.g., time adjustment; 515, a liquid crystal display serving as a display unit; 505, a memory for storing a control program that implements a time measurement function, and various functions associated with that function; 507, an antenna; 506, a communication unit; and 508, a controller for controlling the entire wristwatch by executing the control program. When the received image is saved in the memory 505, reception date information of that image is preferably saved in its image (its file header or the like), a file system that manages image data, or the like. The date information management function of the file system or the like corresponds to associating means that associates a time or date with an image cited in the gist of the present invention. The date information may be superimposed on an image, or may be used in, e.g., management of images.

The memory 505 may have an area for saving the received image or audio-recorded image. When the received image is displayed only on the liquid crystal display 515 but is not saved, the memory size can be reduced.

The liquid crystal display 515 is a compact flat display device having n×m pixels, and preferably uses the one capable of color or monochrome multi-level display.

Reference numeral 509 denotes an audio controller for receiving voice input via a microphone 510, and outputting voice from a loudspeaker 511. Reference numeral 512 denotes a remote-control transceiver, which has the same function as that of the remote controller 450 shown in FIG. 22, and can remote-control the electronic still camera 400 from the wristwatch 500.

Note that the communication unit 506 implements wireless data connection using the same protocol as that of the communication unit 430 in the electronic still camera 400. The protocol used is not particularly limited as long as it can realize wireless communications. For example, infrared ray communications (IrDA) as a state-of-the-art near-distance wireless communication technique may be used. However, in consideration of shortcomings of IrDA (vulnerable to obstacles), radio communication techniques such as FM (frequency modulation), spread spectrum, and the like with low directivity are preferably used. In such case, even when one of the electronic still camera 400 and wristwatch 500 is put into a pocket or bag, data connection is not disturbed.

For example, a near-distance, weak transmitting power, mobile communication technique called "Bluetooth" that covers a near distance around 10 m using a radio wave in the 2.45 GHz band and implements a maximum data transfer of 721 kbps (transfer rate=1 Mbps: 2 Mbps will be supported in the next version) in one-to-one connection is a preferable candidate technique. Currently, this technique can be implemented by mounting a compact transceiver module as small as about 0.5 m² (corresponding to the communication units 430 and 506 in FIGS. 22 and 23). In addition, wireless LAN communication schemes such as 64 kbps PHS *Jiei Hyojun* Ver. 3, 11 Mbps IEEE802.11 HR DSSS, and the like may be used.

The operation will be explained below.

Figure 24:
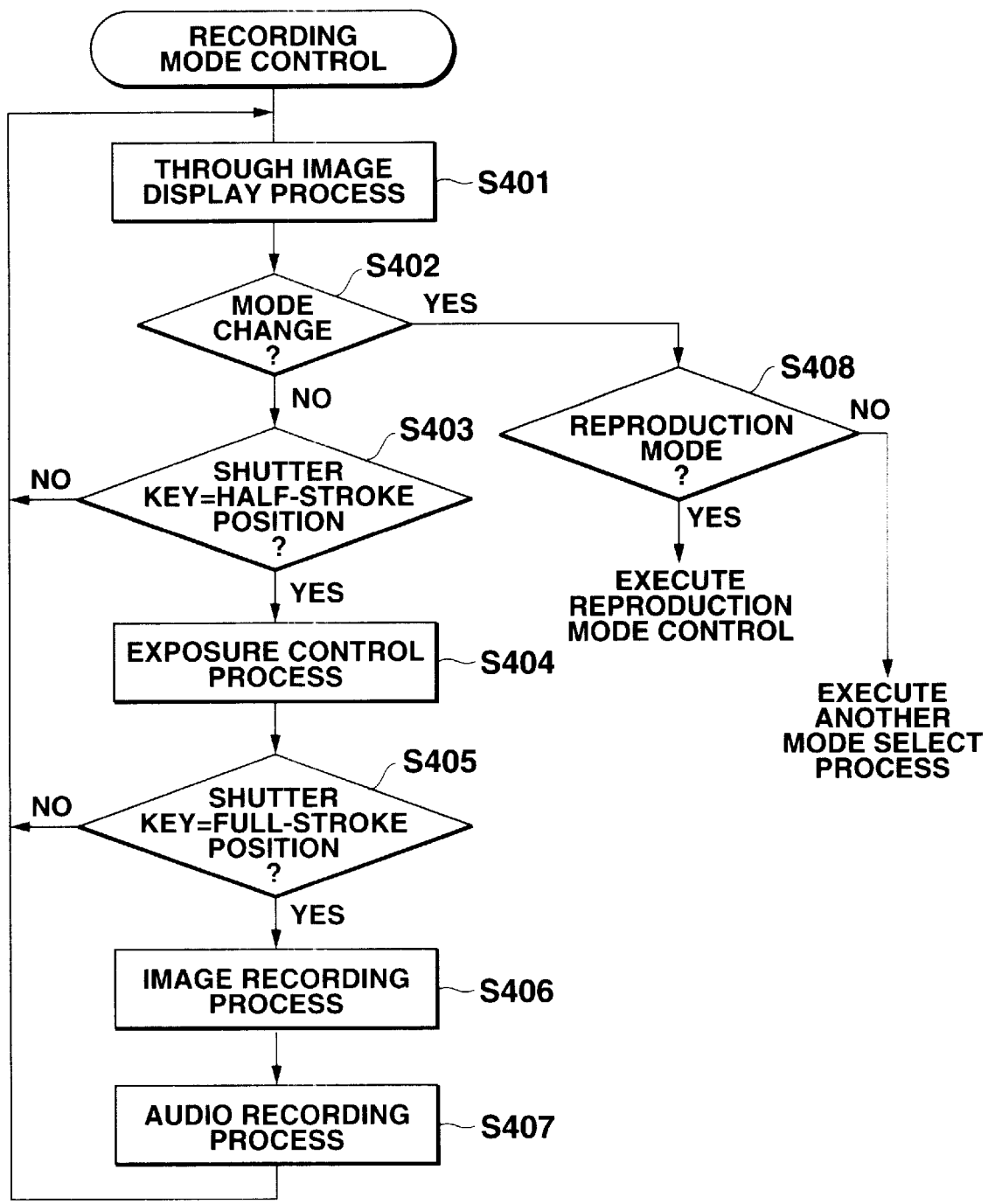
FIG. 24 is a flow chart of a recording mode control program in the electronic still camera of the third embodiment.

FIG. 24 is a flow chart of the control program of the electronic still camera 400, i.e., a schematic flow chart of a program executed by the CPU 424 in the recording mode. This program checks a mode change in response to a predetermined key operation at the key input unit 425 (S402) while executing a through image display process (S401) for displaying a sensed image on the liquid crystal display 402 as a monitor. If no mode change is detected, the program executes an exposure control process (S404) and image recording process (S406) in response to depression of the shutter key 401 (S403, S405).

Also, the program executes an audio recording process (S407) for recording voice input from the microphone 403 within a predetermined time after depression of the shutter key 401. If a mode change is detected, the program checks if the next mode is a reproduction mode (S408). If the reproduction mode is selected, the program executes "reproduction mode control" shown in FIG. 25; otherwise, it executes another mode select process. Note that the operation of the shutter key 401 is not limited to depression, but may be attained by a touch key, remote controller, computer control, or the like.

Figure 25:
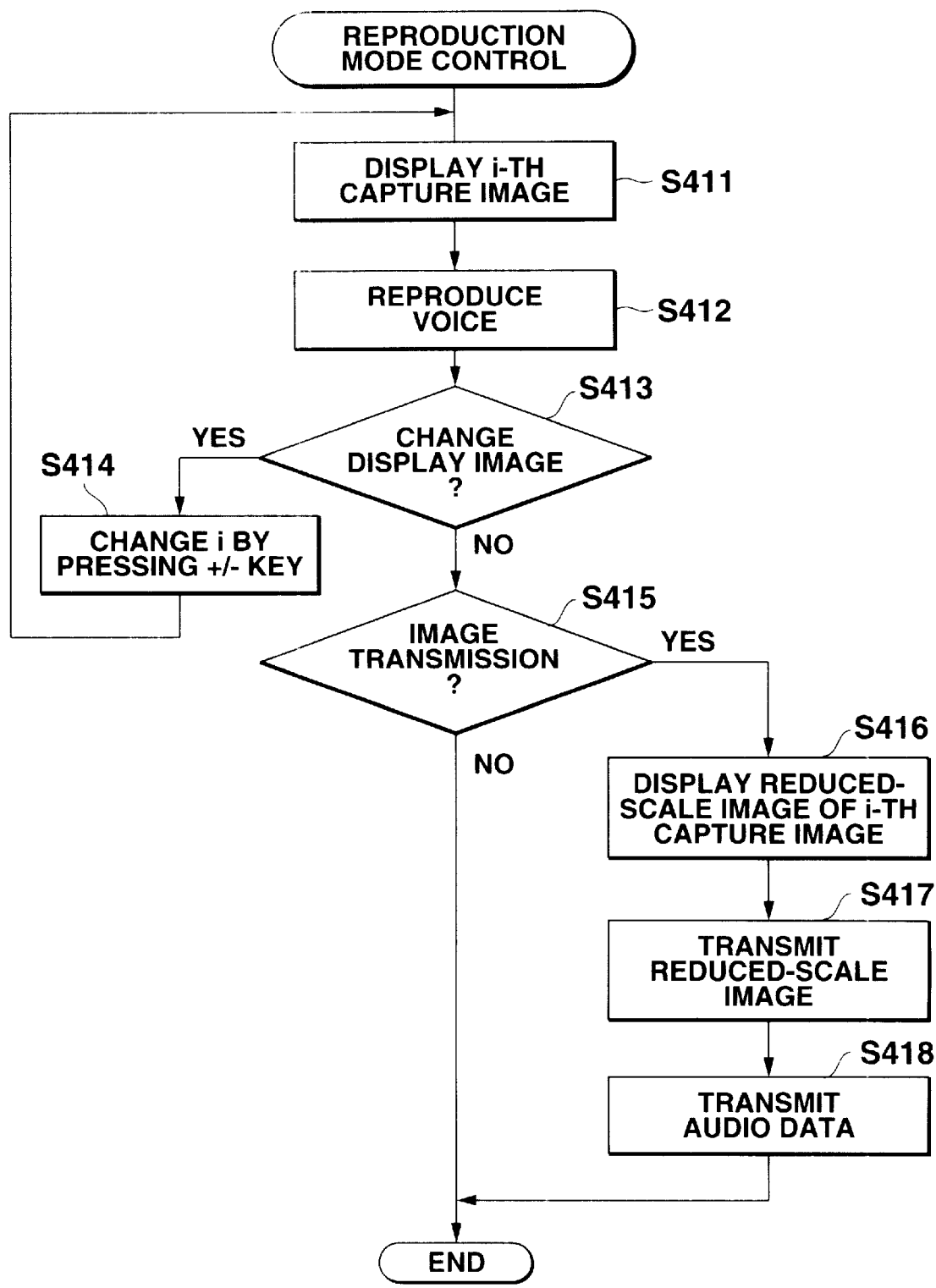
FIG. 25 is a flow chart of a reproduction mode control program in the electronic still camera of the third embodiment.

Referring to FIG. 25, in the "reproduction mode control", the i-th capture image is read out from the flash memory 423, and is expanded by the compression/expansion circuit 421. The expanded image is displayed on the liquid crystal display 402 via the digital video encoder 426 (S411). If audio data is stored together with the i-th capture image, it is read out from the flash memory 423, and is reproduced from the loudspeaker 404 via the audio controller 442 (S412). Note that the initial value of variable i is the number of the latest capture image stored in the flash memory 423, i.e., that of the image which was recorded last.

If the user wants to change a displayed image (YES in step S413), he or she operates, e.g., a plus (+) or minus (−) key to update the value of variable i (S414) to read out the i-th capture image from the flash memory 423 again. The readout image is expanded by the compression/expansion circuit 421, and is displayed on the liquid crystal display 402 via the digital video encoder 426 (S411). Also, voice is reproduced (S412).

After the user confirms that a required image is displayed and required voice is reproduced, it is checked if the image (or audio-recorded image) is to be transmitted (S415). This checking process is implemented by monitoring a predetermined key operation at the key input unit 425. If the image is not transmitted (NO in step S415), the program ends; if the image is to be transmitted (YES in step S415), a reduced-scale image (to be also referred to as a thumbnail image hereinafter) of the i-th capture image, i.e., the capture image which is being displayed on the liquid crystal display 402 is generated (S416), and is transmitted to the external apparatus via the communication unit 430 (S417). If audio data is stored, it is transmitted (S418), thus ending the program. Note that the size of the reduced-scale image matches the display size of the liquid crystal display 515 of the wristwatch 500, and when the number of pixels of a capture image is, e.g., M×N, the reduction factor assumes a value that can convert M×N into the number of pixels (n×m) of the liquid crystal display 515 of the wristwatch 500.

Figure 26:
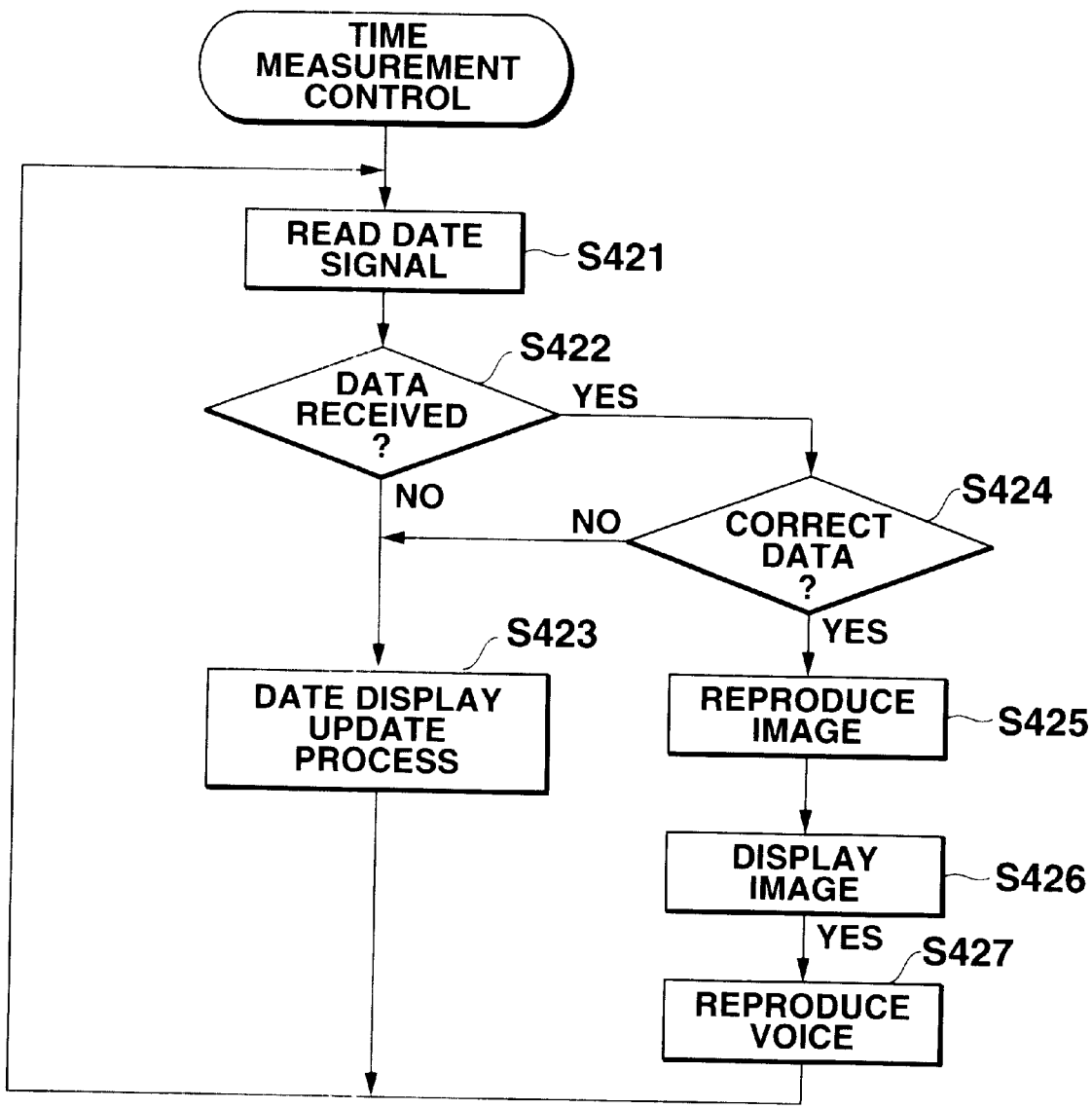
FIG. 26 is a flow chart of a time measurement control program in the wristwatch of the third embodiment.
Figure 27A:
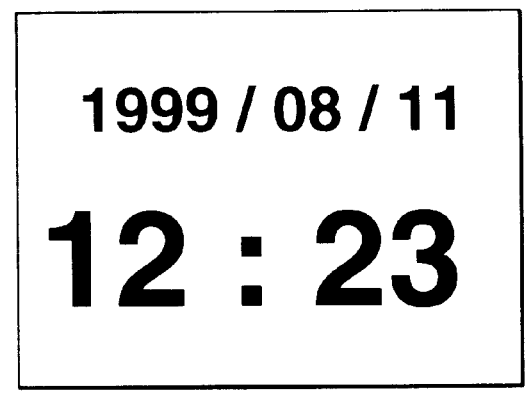
FIGS. 27A and 27B show display examples of the wristwatch of the third embodiment.

FIG. 26 is a schematic flow chart of the time measurement control program executed by the controller 508 of the wristwatch 500. This program reads a date signal from the time measurement circuit 502 (S421), and checks if the communication unit 506 has received data from the electronic still camera 400 (S422). If no data is received (NO in step S422), date display on the liquid crystal display 515 is updated using the date signal read from the time measurement circuit 502 (S423). For example, FIG. 27A shows an example of the date display on the liquid crystal display 515 of the wristwatch 500, which example displays date information "1999/08/11" and time information "12:23".

Figure 27B:
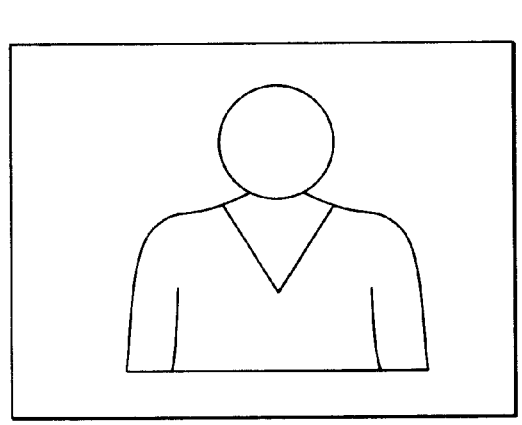

On the other hand, if it is determined in step S422 that data has been received, the program checks if the received data has a correct format (S424). If the received data has a correct format, an image is reproduced from the received data (S425), and the reproduced image is displayed on the liquid crystal display 515 (S426). If the received data includes audio data, voice is reproduced from the loudspeaker 511 via the audio controller 509 (S427). For example, FIG. 27B shows an example of image display on the liquid crystal display 515 of the wristwatch 500, which displays a bust shot of a person. Although not shown, voice recorded upon taking the image of this person is reproduced.

(Fourth Embodiment)

Figure 28:
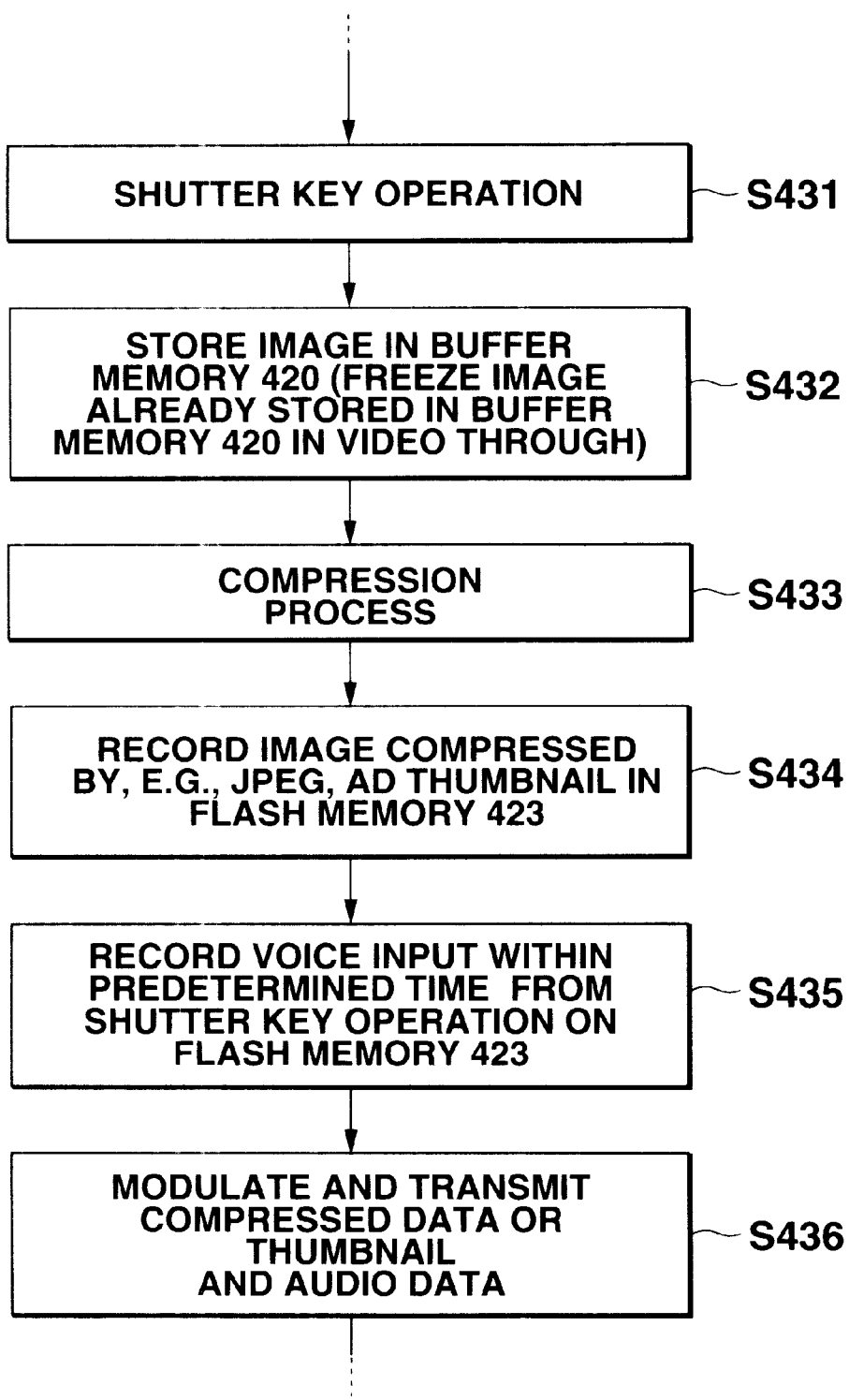
FIG. 28 is a flow chart executed upon operation of a shutter key in an electronic still camera according to the fourth embodiment of the present invention.

FIG. 28 is a flow chart showing a process for transferring an image taken by the electronic still camera 400 to the wristwatch 1 in response to operation of the shutter key 401 according to the fourth embodiment of the present invention. In this flow chart, upon detecting operation of the shutter key 401 (S431), an image sensing process is done. More specifically, an image sensed by the CCD 413 undergoes a predetermined process, and is stored in the buffer memory 420 (in a video through process, a display process is done while repetitively storing an image in the buffer memory 420) (S432). The stored image is compressed (S433), and the compressed image is recorded on the flash memory 423 (S434). In this case, a pair of an image compressed by JPEG and its thumbnail image are recorded. Also, voice input from the microphone 403 within a predetermined time after the shutter key operation is recorded on the flash memory 423 (S435). After that, the compressed image or thumbnail image and audio data are modulated and transmitted (S436).

The image and voice to be modulated may be read out once they are written in the flash memory 423 or may directly undergo a modulation/transmission process parallel to a write in the flash memory 423 or without any write.

(Fifth Embodiment)

Figure 29:
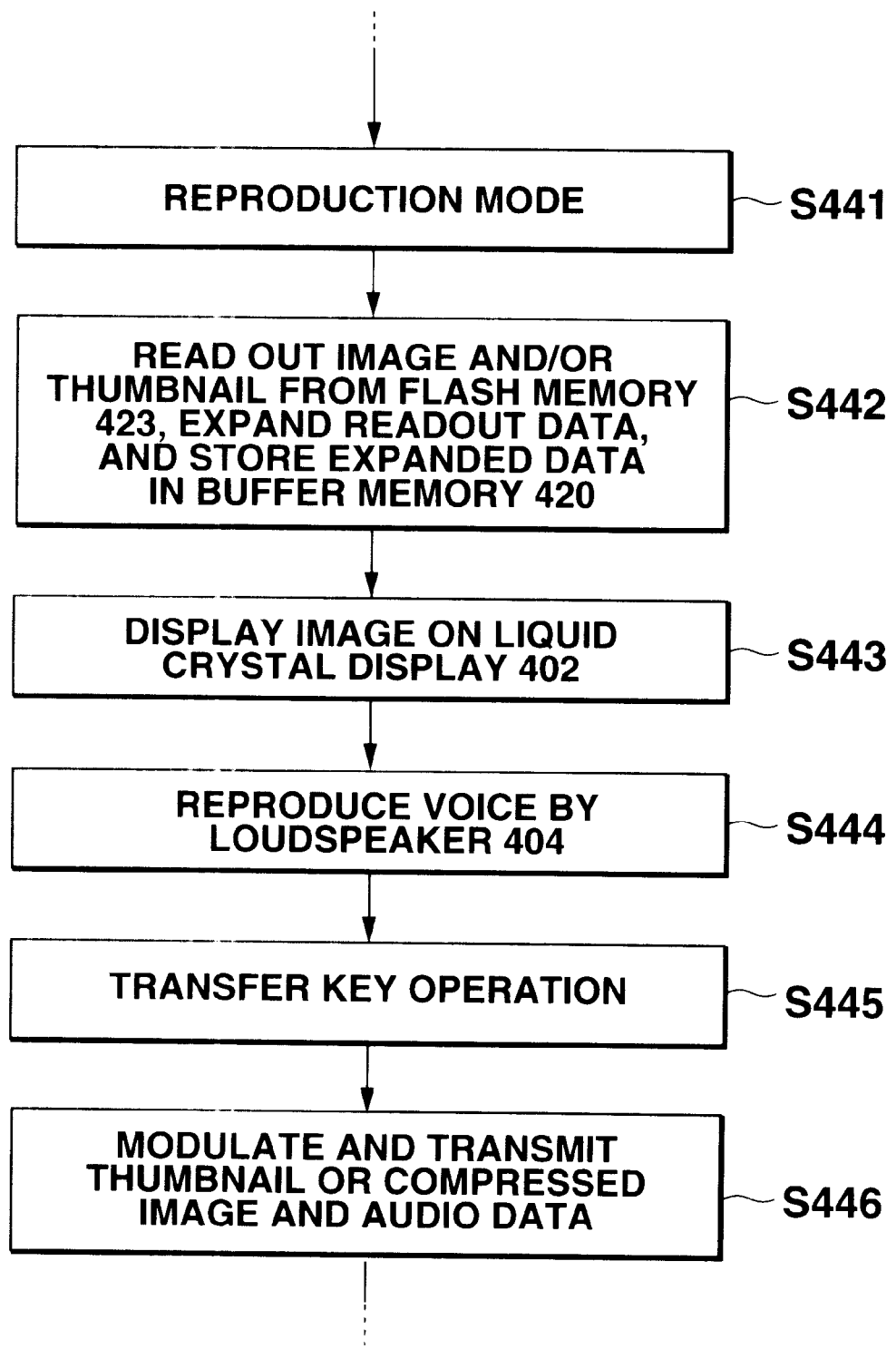
FIG. 29 is a flow chart executed upon operation of a transfer key in an electronic still camera according to the fifth embodiment of the present invention.

FIG. 29 is a flow chart showing a transfer process executed in response to operation of the transfer key 405 in place of the image transfer process in response to the shutter key 401 according to the fifth embodiment of the present invention. In this flow chart, the reproduction mode is set (S441). An image recorded on the flash memory 423 (normally, the image taken last) is read out and expanded, and is read out onto the buffer memory 420 (S442). In this case, a thumbnail may be read out together or before that image. The readout image is displayed on the liquid crystal display 402 (S443). If audio data is recorded together with the image, it is reproduced by the loudspeaker 404 (S444). When the user wants to send the image to the wristwatch 500, he or she operates the transfer key 405 (S445). Then, the compressed image or thumbnail image and audio data are modulated and transmitted under the control of the CPU 424 (S446).

(Sixth Embodiment)

Figure 30:
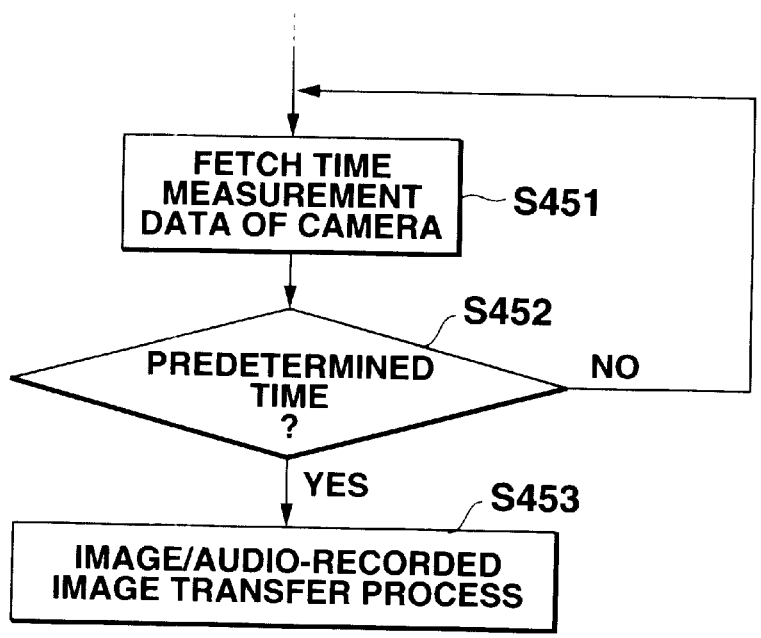
FIG. 30 is a flow chart showing an image transfer process based on the measured time in an electronic still camera according to the sixth embodiment of the present invention.

FIG. 30 is a flow chart showing the process for transferring an image in accordance with time data measured by the timepiece circuit 440 of the electronic still camera 400 in place of transferring an image in response to a manual key operation of, e.g., the shutter key 401 or transfer key 405 according to the sixth embodiment of the present invention. That is, the time data measured by the timepiece circuit 440 of the electronic still camera 400 is fetched (S451). If the time data indicates a specific date/time such as noon or the like (S452), an image or audio-recorded image is automatically transmitted (S453).

(Seventh Embodiment)

Figure 31:
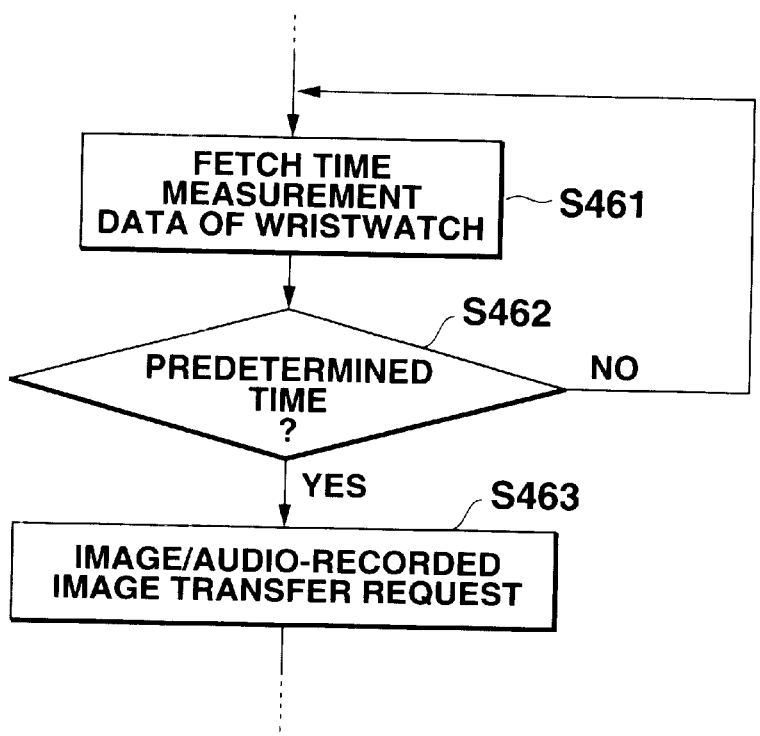
FIG. 31 is a flow chart showing an image transfer request process based on the measured time in a wristwatch according to the seventh embodiment of the present invention.

FIG. 31 is a flow chart showing the process for transmitting a transfer request signal to the electronic still camera 400 using time data measured by the time measurement circuit 502 of the wristwatch 500 in place of the timepiece circuit 440 of the camera, according to the seventh embodiment of the present invention. That is, time data measured by the time measurement circuit 502 of the wristwatch 500 is fetched (S461). If the time data indicates a specific date/time such as noon or the like (S462), an image/audio-recorded image transfer request is automatically output to the electronic still camera 400 (S463). Upon receiving the transfer request signal, the electronic still camera 400 executes an image transfer process, and the wristwatch 500 receives the transferred image.

Figure 32:
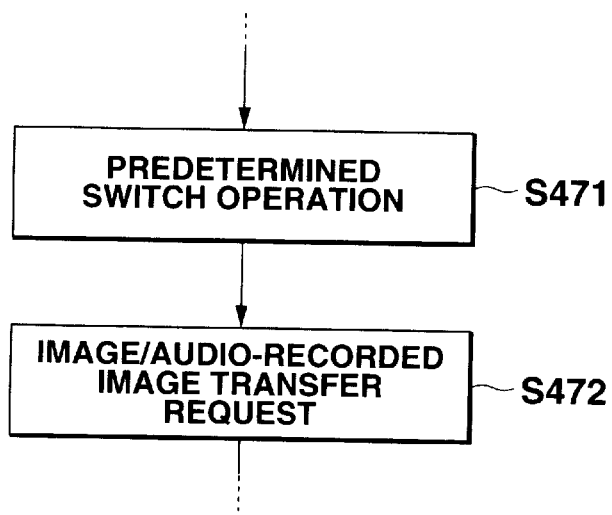
FIG. 32 is a flow chart showing an image transfer request process in response to a predetermined switch operation of a wristwatch in a modification.

Alternatively, as shown in FIG. 32, upon depression of a predetermined switch on the wristwatch 500 (S471), an image transfer request signal may be transmitted to the electronic still camera 400 (S472).

(Eighth Embodiment)

Figure 33:
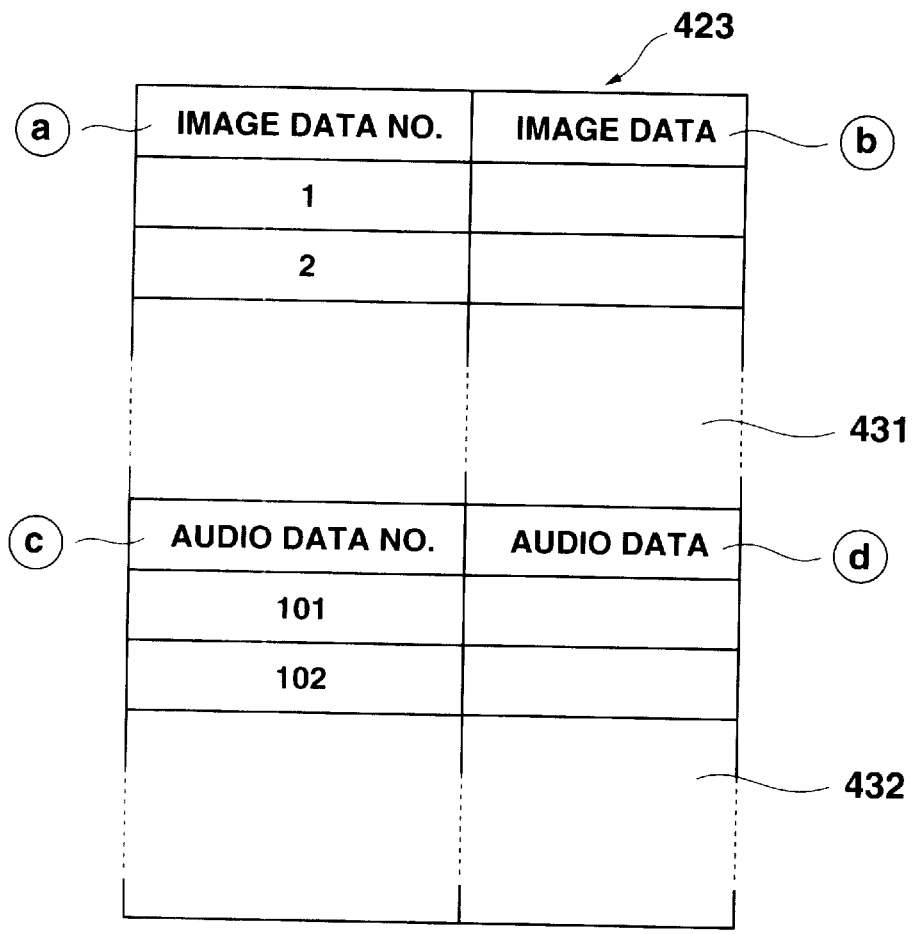
FIG. 33 shows the memory map of a flash memory in the eighth embodiment of the present invention.

FIGS. 33 to 37 show the eighth embodiment of the present invention. That is, the flash memory 423 of the electronic still camera 400 has an image data storage area 431 and audio data storage area 432, as shown in FIG. 33. The image data storage area 431 stores image data which is captured in the capture mode and encoded by JPEG, in correspondence with image data NO. The audio data storage area 432 stores audio data sent from the wristwatch 500 in correspondence with audio data NO., as will be described later.

Figure 34:
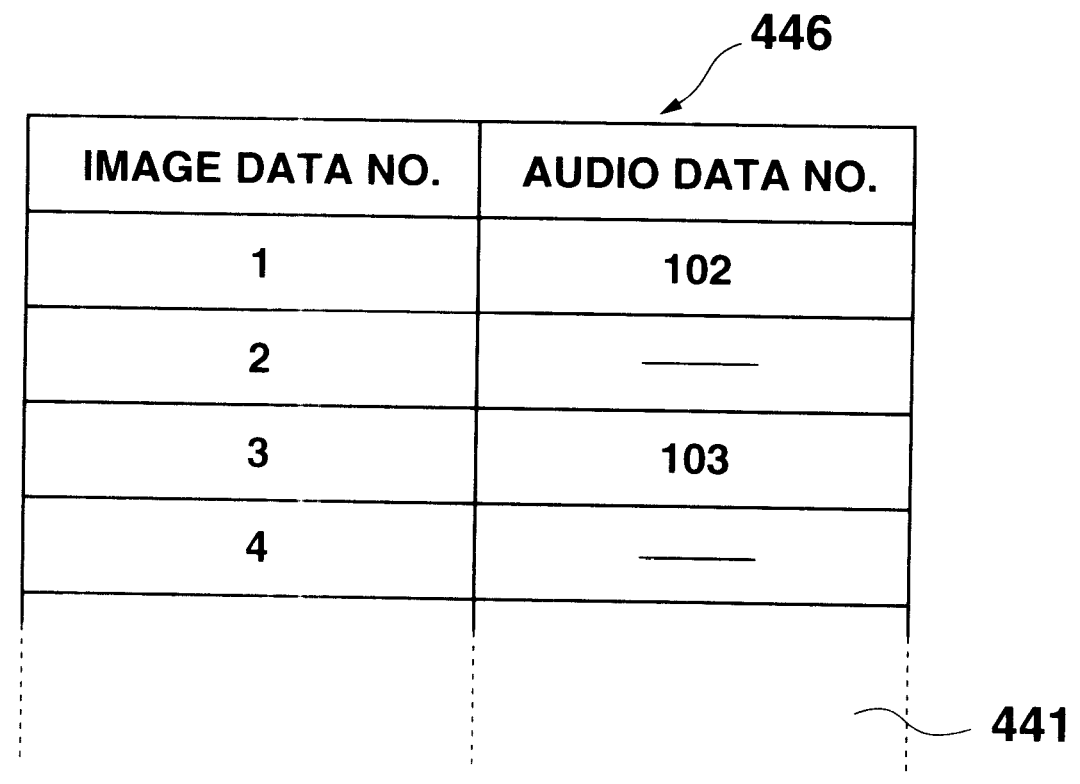

Furthermore, a data correspondence memory 441 is assured on the work RAM 424b, as shown in FIG. 34. This data correspondence memory 441 stores the correspondence between image data stored in the image data storage area 431, and audio data stored in the audio data storage area 432 as pairs of image and audio data NOs.

Figure 35:
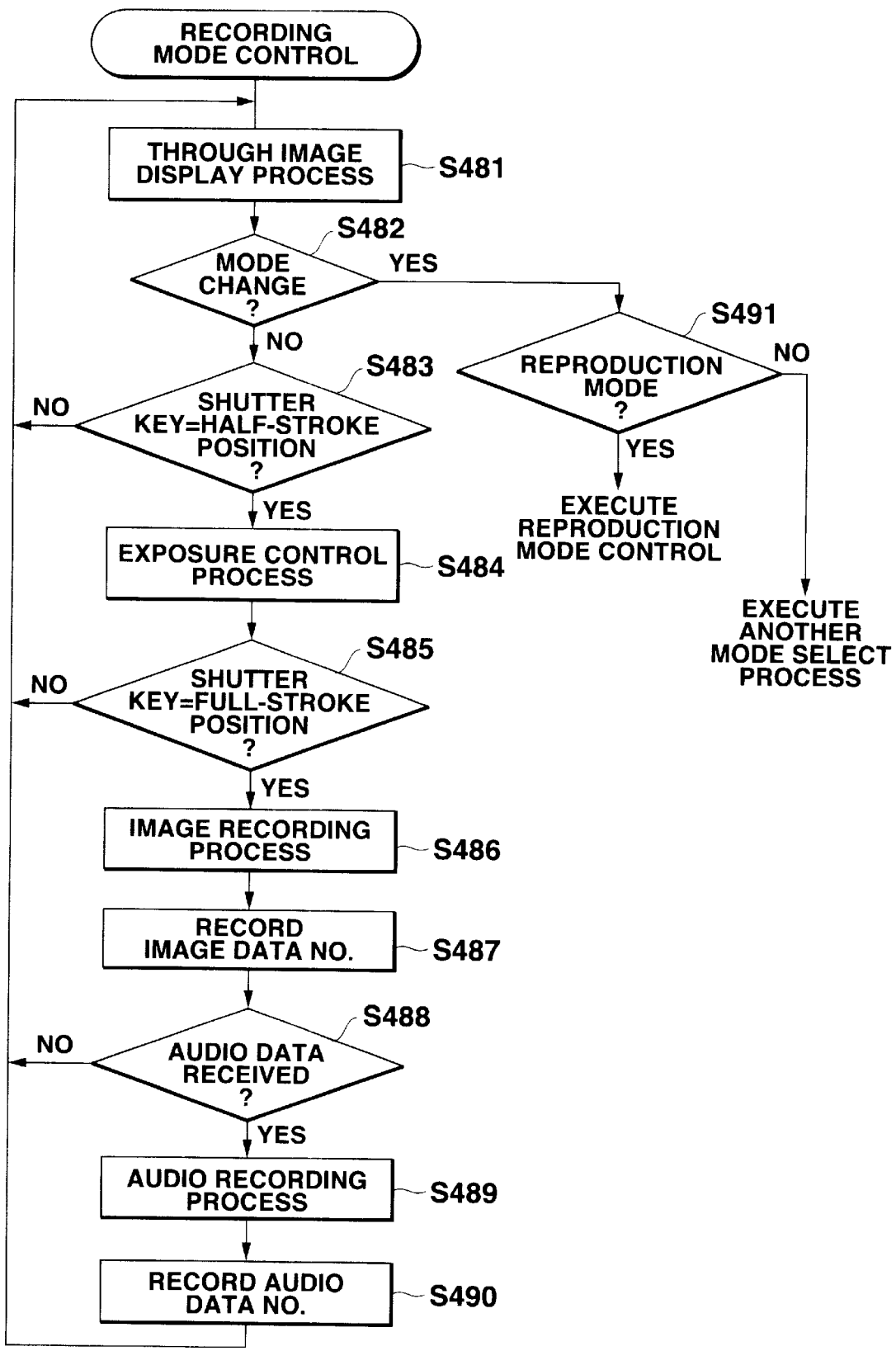
FIG. 35 is a flow chart of a recording mode control program in an electronic still camera of the eighth embodiment.

FIG. 35 is a flow chart of the control program of the electronic still camera 400 in this embodiment. In this flow chart, steps S481 to S486 and S491 are the same processes as those in steps S401 to S407 in FIG. 24 above. However, in the image recording process (S486), image data is stored in the image data storage area 431 shown in FIG. 33. Subsequently, the image data NO. of the image data storage area 431 where that image data is stored is read, and is stored in the data correspondence memory (S487). It is then checked if audio data sent from the wristwatch 500 is received (S488), as will be described later. If audio data is received, the received audio data is stored in the audio data storage area 432 (S489). Furthermore, the audio data NO. of the audio data storage area 432 where that audio data is stored is read, and is stored in the data correspondence memory 441 in correspondence with the image data No. stored in step S487 (S490).

Figure 36:
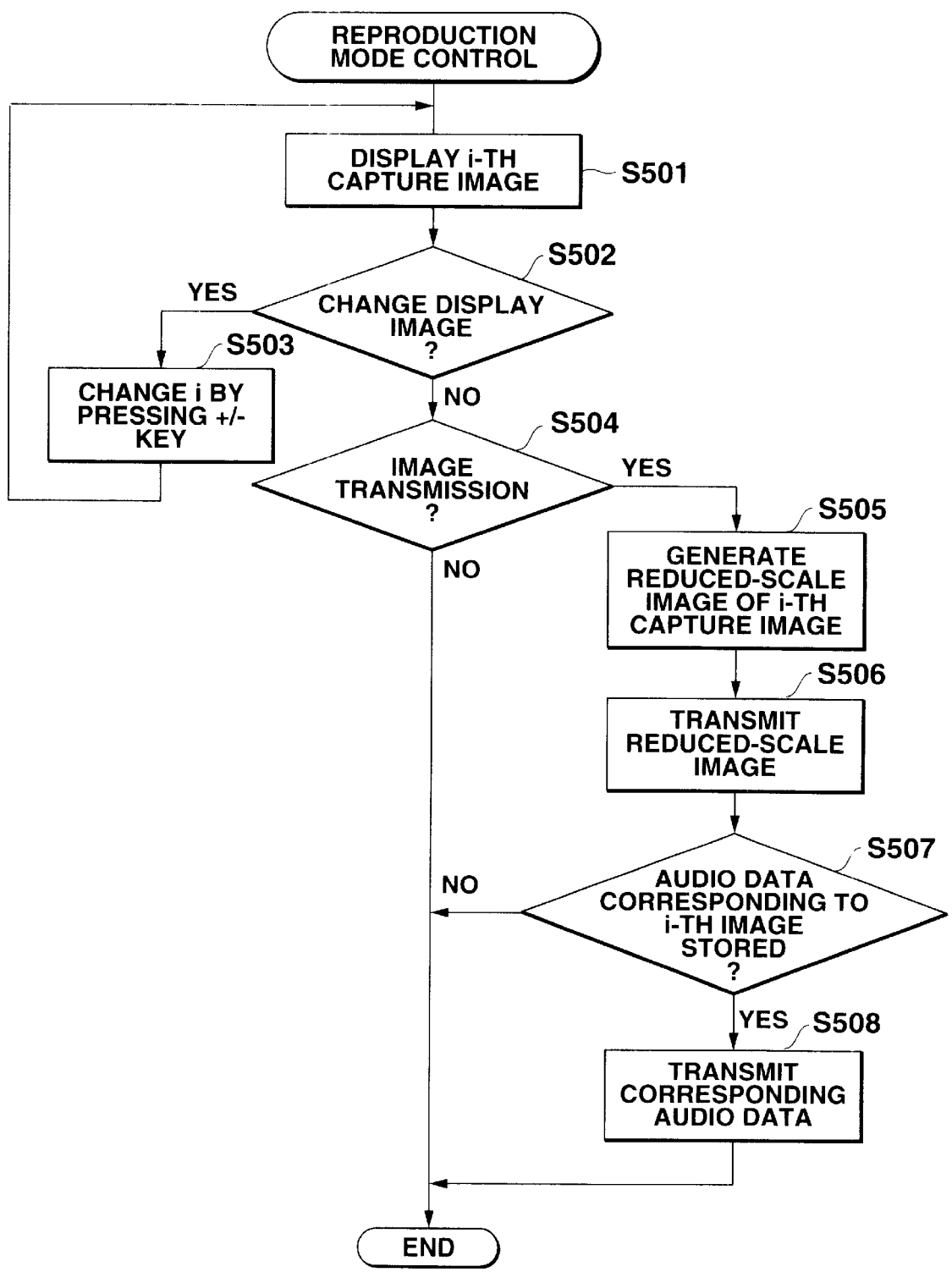
FIG. 36 is a flow chart of a reproduction mode control program in an electronic still camera of the eighth embodiment.

In the "reproduction mode control" in FIG. 36, steps S501 to S506 are the same processes as those in steps S411 to S416 in FIG. 25. After the i-th reduced-scale image is transmitted (S506), it is checked with reference to the data correspondence memory 441 if audio data corresponding to that i-th image (image of the image data NO. i) is stored (S507). If the corresponding audio data is stored, it is read out from the audio data storage area 432, and is transmitted (S508).

Figure 37:
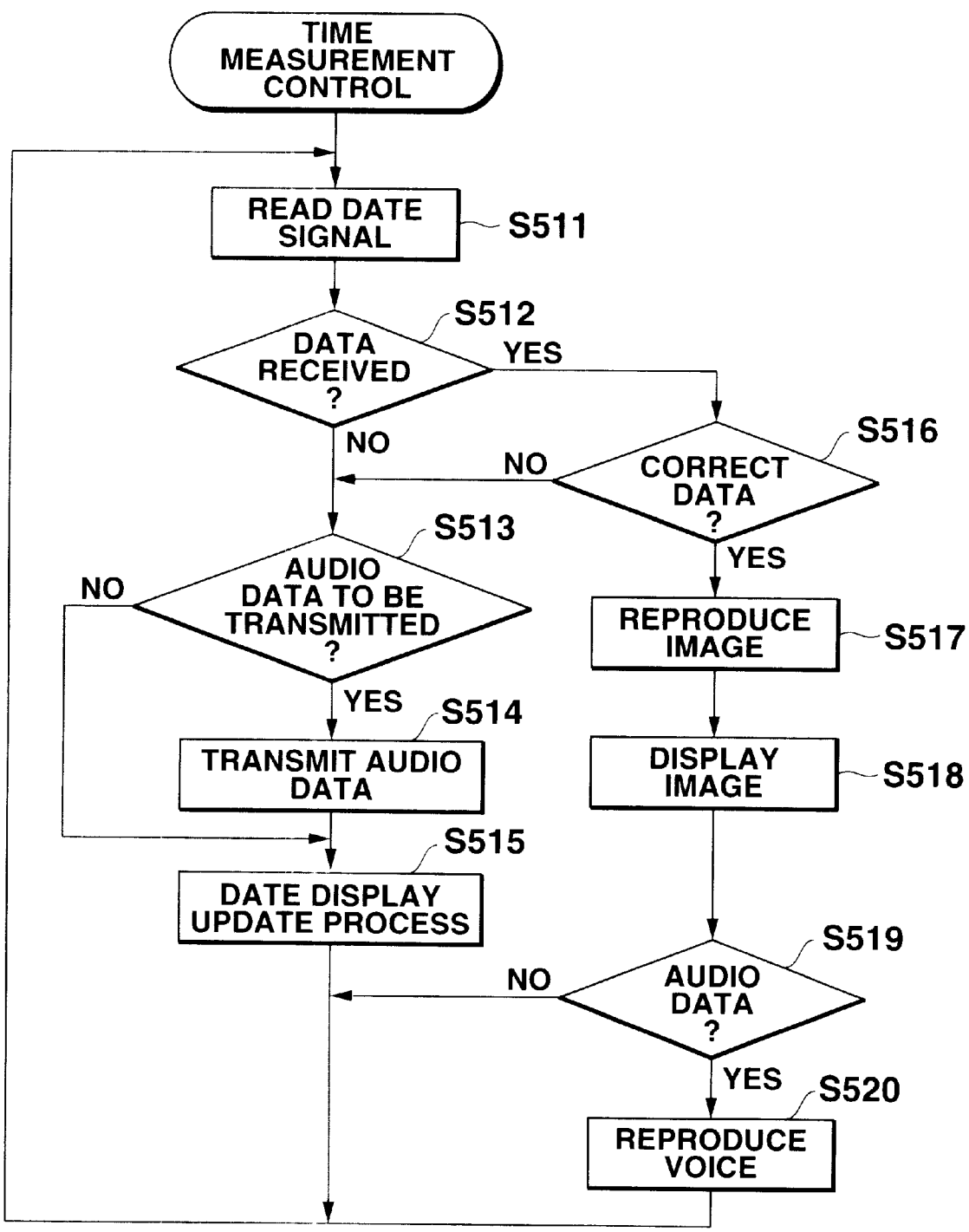
FIG. 37 is a flow chart of a time measurement control program in a wristwatch of the eighth embodiment.
Figure 38A:
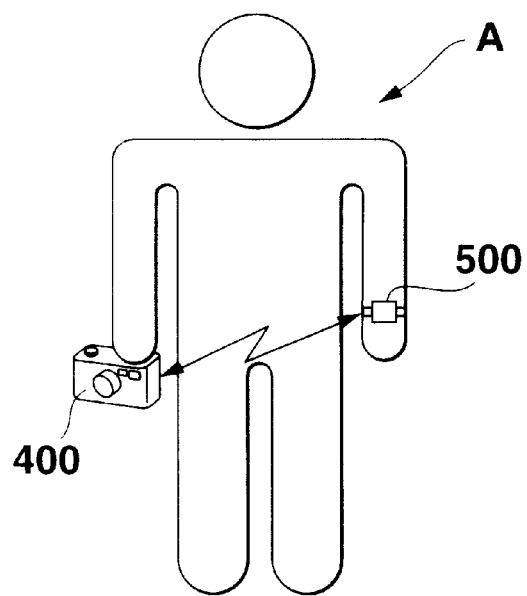
FIGS. 38A and 38B show use examples of the system of the eighth embodiment.
Figure 38B:
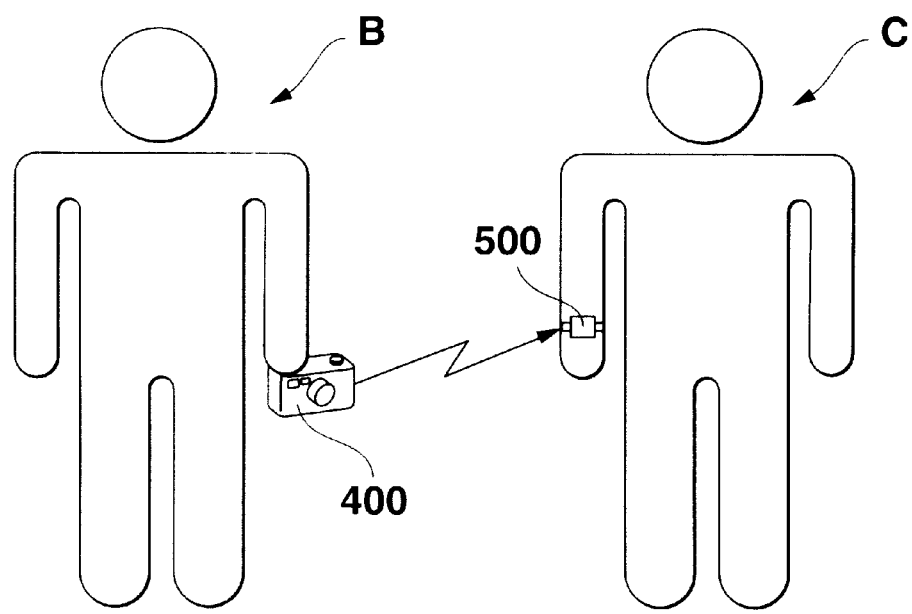

FIG. 37 is a schematic flow chart of the time measurement control program executed by the controller 508 of the wristwatch 500. As in the embodiment shown in FIG. 26, this program reads a date signal from the time measurement circuit 502 (S511), and checks if the communication unit 506 has received data from the electronic still camera 400 (S512). If no data is received (NO in step S512), it is checked if audio data to be transmitted to the electronic still camera 400 is present (S513). At this time, the presence of audio data to be transmitted is determined when the user inputs voice from the microphone 510 while making predetermined key operation on the key input unit 503 (YES in step S513), and audio data input from the microphone 510 is transmitted (S514). The presence/absence of reception of data transmitted in step S514 is checked in step S488 in FIG. 35 above. Also, date display on the liquid crystal display 515 is updated using the date signal read from the time measurement circuit 502 (S515).

On the other hand, if it is determined in step S512 that data has been received, the program checks if the received data has a correct format (S516). If the received data has a correct format, an image is reproduced from the received data (S517), and the reproduced image is displayed on the liquid crystal display 515 (S518). Furthermore, it is checked if the received data includes audio data (S519). If YES in step S519, voice is reproduced based on that audio data (S520). Therefore, upon executing the processes in steps S517 and S520, as shown in, e.g., FIG. 27B, not only a bust shot of a person is displayed on the liquid crystal display 515 of the wristwatch 500, but also a comment or the like recorded simultaneously with that image is output from the loudspeaker 511.

As described above, according to the electronic still camera 400 and wristwatch 500 of this embodiment, during reproduction of an arbitrary image on the electronic still camera 400, reduced-scale image data of that reproduced image can be sent by radio. In addition, when the wristwatch 500 is present within the access area of a radio wave, it can receive that reduced-scale image data and display the data on its liquid crystal display 515. Furthermore, during reproduction of an arbitrary image on the electronic still camera 400, reduced-scale image data of that reproduced image, and its associated audio data can be sent by radio. Also, when the wristwatch 500 is present within the access area of a radio wave, it can receive that reduced-scale image data and display the data on its liquid crystal display 515, and can also receive audio data and reproduce it from the loudspeaker 511.

Therefore, the camera and wristwatch can be systematically used as follows, and new applications of the wristwatch with the display device can be explored.

(A) In FIG. 33A, person A carries both the electronic still camera 400 and wristwatch 500. Person A can reproduce and confirm an image taken by the electronic still camera 400 on its liquid crystal display 402. Also, by sending the reproduced image, person A can confirm that image on the liquid crystal display 515 of the wristwatch 500. According to this use method, the liquid crystal display 515 of the wristwatch 500 can be used in place of the monitor screen (liquid crystal display 402) of the electronic still camera 400.

Also, person A can transmit his or her voice from the wristwatch 500 to the electronic still camera 400 upon taking an image by the electronic still camera 400, and can store the image taken by the electronic still camera 400 and received audio data in association with each other. Furthermore, when the image and audio data stored in the electronic still camera 400 in association with each other are transmitted, the user can confirm the image on the liquid crystal display 515 of the wristwatch 500, and can hear associated voice from the loudspeaker 511.

(B) In FIG. 33B, person B carries the electronic still camera 400, and person C carries (wears) the wristwatch 500. When persons B and C are located within the access range of a radio wave, image data and audio data sent from the electronic still camera 400 can be received by the wristwatch 500 of person C. According to this use method, an image and voice can be easily transferred between persons B and C. Even if persons B and C are not acquainted with each other, an image and voice can be transferred between them. The system of this embodiment can be used, for example, in an encounter game on a crowded street.

In the above embodiment, an electronic still camera has been exemplified, but the present invention is not limited to such specific apparatus. An image recording apparatus that can electronically record an image can be used, and the present invention can be applied to a movie camera, as described above.

Various modifications of the above embodiment can be made within the scope of the present invention. For example, the image to be sent to the wristwatch 500 may be image data compressed by JPEG. In this case, the wristwatch 500 requires a JPEG expansion function.

The image to be transferred to the wristwatch 500 need not always be a set of image data. For example, image data to be transferred may be segmented into a plurality of segments, and may be transferred in units of segmented data. Note that image data may be segmented by a fixed length from the head of image data, or may be segmented in units of pixels. For example, the two-dimensional plane of the image may be segmented into a plurality of regions (or in units of scan lines), and image data may be transferred in units of pixel data included in the segmented regions. Alternatively, an image may be segmented into frequency components, and may be transferred in units of segmented frequency component data. An image may be reproduced simultaneously after all transferred data are received or sequentially every time each transferred data is received.

Furthermore, an image to be transferred to the wristwatch 500 may be a through image which is displayed on the liquid crystal display 402 of the electronic still camera 400 at predetermined periods (normally, 1/30-sec periods). In this case, a through image may be directly used as the image to be transferred to the wristwatch 500, but an intermittent image of some through images may be used as the image to be transferred.

Moreover, the electronic still camera 400 may be operated from the wristwatch 500. For example, when the zoom, exposure, focusing, image quality adjustment, field angle adjustment, ON/OFF of the continuous shot function, and the like of the electronic still camera 400 can be controlled from the wristwatch 500, the wristwatch 500 can be preferably used as a remote controller of the electronic still camera 400. Furthermore, the camera and wristwatch with such function can be applied to a personal LAN and network game. Also, the present invention can be applied to a link system among a portable telephone, portable information apparatus, and wristwatch.

In addition, when the camera function is built in the wristwatch, a camera-timepiece link system that can offer many variations can be built. That is, an image taken by the timepiece can be transmitted to the camera, and can be associated with voice on the timepiece or camera side.

Further, when the system of the present invention is connected to a wireless LAN or the Internet, it can be used in network applications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A link system for a camera and wristwatch, comprising:
   a camera which comprises recording means for electronically recording an image of an object, and transmission means for transmitting the recorded image on a radio wave; and
   a wristwatch which comprises display means that can display a current time and image, reproduction means for receiving the radio wave from said camera located at a nearby position, and reproducing the image, and display control means for controlling said display means to display the reproduced image.

2. A camera system comprising:
   a camera which comprises image sensing means, recording control means for recording an image sensed by said image sensing means on a memory, and transmission means for transmitting the sensed image by a radio wave, said camera comprising a shutter, said recording control means recording the image sensed by said image sensing means on said memory in response to operation of said shutter, and said camera having transmission control means for controlling said transmission means to transmit the sensed image in response to operation of said shutter; and
   a timepiece which comprises display means that can display a current time and image, reception means for receiving the radio wave from said camera located at a nearby position, and display control means for controlling said display means to display the received image.

3. A system according to claim 2, wherein said recording control means of said camera executes an image process of the image sensed by said image sensing means, and records the processed image on said memory, and said transmission control means transmits the image processed by said recording control means to said timepiece.

4. A system according to claim 2, wherein said recording control means of said camera executes an image process of the image sensed by said image sensing means, and records the processed image on said memory, and said transmission control means reads out the image recorded on said memory and transmits the readout image to said timepiece.

5. A camera system comprising:
   a camera which comprises image sensing means, recording control means for recording an image sensed by said image sensing means on a memory, and transmission means for transmitting the sensed image by a radio wave, said camera comprising a shutter and transfer switch, said recording control means recording the image sensed by said image sensing means on said memory in response to operation of said shutter, and said camera having transmission control means for controlling said transmission means to transmit the sensed image in response to operation of said transfer switch; and
   a timepiece which comprises display means that can display a current time and image, reception means for receiving the radio wave from said camera located at a nearby position, and display control means for controlling said display means to display the received image.

6. A system according to claim 5, wherein said recording control means of said camera executes an image process of the image sensed by said image sensing means, and records the processed image on said memory, and said transmission control means transmits the image processed by said recording control means to said timepiece.

7. A system according to claim 5, wherein said recording control means of said camera executes an image process of the image sensed by said image sensing means, and records the processed image on said memory, and said transmission control means reads out the image recorded on said memory and transmits the readout image to said timepiece.

8. A camera system comprising:
   a camera which comprises image sensing means, and transmission means for transmitting a sensed image by a radio wave; and
   a timepiece which comprises display means that can display a current time and image, reception means for receiving the radio wave from said camera located at a nearby position, and display control means for controlling said display means to display the received image,
   wherein said camera comprises a shutter and transmission control means for controlling said transmission means to transmit the sensed image in response to operation of said shutter, does not comprise any memory for saving the sensed image, and said transmission control means transmits the image sensed by said image sensing means directly or via an image process to said timepiece in response to operation of said shutter.

9. A camera system comprising:
   a camera which comprises image sensing means, image processing means for processing an image sensed by said image sensing means into a predetermined format, transmission means for modulating and transmitting the image processed by said image processing means, and time measurement means; and
   a timepiece which comprises reception means for receiving and demodulating the incoming image, and display means for displaying the image received by said reception means,
   wherein said transmission means of said camera transmits the image at a predetermined timing based on a time measured by said time measurement means of said camera.

10. A camera system comprising:
    a camera which comprises image sensing means, image processing means for processing an image sensed by said image sensing means into a predetermined format, transmission means for modulating and transmitting the image processed by said image processing means, and time measurement means; and
    a timepiece which comprises time measurement means, request means for transmitting a request signal to said camera, reception means for receiving and demodulating the incoming image, and display means for displaying the image received by said reception means,
    wherein said transmission means of said camera transmits the image at a predetermined timing based on a time measured by said time measurement means of said timepiece.

11. A camera system comprising:
    a camera which comprises image sensing means, image processing means for processing an image sensed by said image sensing means into a predetermined format, transmission means for modulating and transmitting the image processed by said image processing means, and time measurement means; and a timepiece which comprises time measurement means, request means for transmitting a request signal to said camera, reception means for receiving and demodulating the incoming image, and display means for displaying the image received by said reception means, wherein said transmission means of said camera transmits the image upon receiving the request signal from said request means of said timepiece.

12. A camera system comprising:

a camera which comprises image sensing means, recording control means for recording an image sensed by said image sensing means on a memory, and generating a thumbnail of the image, and transmission means for transmitting the sensed image by a radio wave; and a timepiece which comprises display means that can display a current time and image, reception means for receiving the radio wave from said camera located at a nearby position, and display control means for controlling said display means to display the received image, wherein said transmission means of said camera transmits the thumbnail of the sensed image.

13. A camera system comprising:

a camera which comprises image sensing means, recording control means for recording an image sensed by said image sensing means on a memory, and transmission means for transmitting the sensed image by a radio wave; and a timepiece which comprises display means that can display a current time and image, reception means for receiving the radio wave from said camera located at a nearby position, and display control means for controlling said display means to display the received image, wherein said recording control means of said camera comprises means for compressing the image sensed by said image sensing means, and said transmission means transmits the image compressed by said recording control means.

14. A camera system comprising:

a camera which comprises image sensing means, recording control means for recording an image sensed by said image sensing means on a memory, and transmission means for transmitting the sensed image by a radio wave; and a timepiece which comprises display means that can display a current time and image, reception means for receiving the radio wave from said camera located at a nearby position, and display control means for controlling said display means to display the received image, wherein said recording control means of said camera comprises segmentation means for segmenting the image sensed by said image sensing means or the image stored in said memory into a plurality of segmented images, and said transmission means transmits the segmented images a plurality of number of times, and said reception means of said timepiece comprises reproduction means for reproducing a single image from the plurality of segmented images transmitted in turn from said camera.

15. A camera system comprising:

a camera which comprises image sensing means, recording control means for recording an image sensed by said image sensing means on a memory, and transmission means for transmitting the sensed image by a radio wave; and a timepiece which comprises display means that can display a current time and image, reception means for receiving the radio wave from said camera located at a nearby position, and display control means for controlling said display means to display the received image, wherein said image sensing means and said recording control means of said camera sequentially capture an object image in cooperation with each other as a finder, and the captured image is displayed on said display means of said timepiece as a video through image via said transmission means of said camera and said reception means of said timepiece.

16. A camera system comprising:

a camera which comprises image sensing means, recording control means for recording an image sensed by said image sensing means on a memory, and transmission means for transmitting the sensed image by a radio wave; and a timepiece which comprises display means that can display a current time and image, reception means for receiving the radio wave from said camera located at a nearby position, and display control means for controlling said display means to display the received image, wherein said image sensing means and said recording control means of said camera intermittently capture an object image in cooperation with each other as a still image, and the captured image is intermittently transmitted to said timepiece via said transmission means of said camera and said reception means of said timepiece, and is displayed as an intermittent still image on said display means of said timepiece.

17. A camera system comprising:

a camera including image sensing means, processing means for executing an image process of an image sensed by said image sensing means into a data format suitable for storage or transmission, a memory for storing the image which has undergone the image process of said processing means, a date circuit for storing a time or date, and transmission means for transmitting the image, and the time or date stored in said date circuit; and a timepiece including time measurement means for measuring a time or date, reception means for receiving the incoming image and time or date, display means for simultaneously or independently displaying the time or date measured by said time measurement means, and the image received by said reception means, and associating means for associating the image received by said reception means with the time or date received by said reception means.

18. A camera system comprising:

a camera including image sensing means, processing means for executing an image process of an image sensed by said image sensing means into a data format suitable for storage or transmission, a memory for storing the image which has undergone the image process of said processing means, and transmission means for transmitting the image; and a timepiece including time measurement means for measuring a time or date, reception means for receiving the incoming image, display means for simultaneously or independently displaying the time or date measured by said time measurement means, and the image received by said reception means, and associating means for associating the image received by said reception means with the time or date measured by said time measurement means.

19. A camera system comprising:

a wristwatch having time measurement means, including first storage means for storing data of time or date information measured by said time measurement means, and transmission means for modulating and transmitting the data of the time or date information stored in said first storage means; and a camera apparatus having image sensing means, including reception means for receiving and demodulating the data transmitted from said transmission means of said wristwatch, second storage means for storing the data of the time or date information demodulated by said reception means, third storage means for executing an image process of image data sensed by said image sensing means, and storing the processed image data, and control means for associating the image data stored in said third storage means with the data of the time or date information stored in said second storage means.

20. A system according to claim 19, wherein said wristwatch further includes sensor means for acquiring or generating predetermined measurement information, and fourth storage means for storing the measurement information acquired or generated by said sensor means, said wristwatch modulates and transmits the measurement information stored in said fourth storage means using said transmission means, said camera apparatus further includes fifth storage means, said camera apparatus receives and demodulates the measurement information transmitted from said transmission means of said wristwatch using said reception means, stores the demodulated measurement information in said fifth storage means, and associates the measurement information stored in said fifth storage means with the image data stored in said third storage means using said control means.

21. A camera system comprising:

a timepiece apparatus which has time measurement means for measuring a current time, and is housed in a first housing, including transmission means for transmitting data of measured time or date information to a camera apparatus; and a camera apparatus which has image sensing means and is housed in a second housing independent from said first housing, including reception means for receiving the data transmitted from said transmission means.

22. A system according to claim 21, wherein said timepiece apparatus is a wristwatch type timepiece apparatus, said camera apparatus is a portable camera apparatus carried by a person who wears said wristwatch type timepiece apparatus on his or her wrist, and said transmission means has weak transmitting power for a near-distance range.

23. A system according to claim 21, wherein said camera apparatus further has a memory for storing time or date information, setting means for setting the time or date information received by said reception means in said memory, and adding means for adding the time or date information set in said memory to the sensed image.

24. A system according to claim 21, wherein said transmission means transmits the data in response to a predetermined operation.

25. A system according to claim 21, wherein said transmission means automatically transmits the data at a predetermined timing.

26. A system according to claim 21, wherein said transmission means transmits the data in response to a request signal from said camera apparatus.

27. A system according to claim 21, wherein said camera apparatus has time measurement means for measuring a current time, and said time measurement means corrects the current time, which is being measured, on the basis of the time or date information transmitted from said timepiece apparatus.

28. A system according to claim 21, wherein said camera apparatus does not have any time measurement means, and said camera apparatus receives the time or date information transmitted from said timepiece apparatus and displays the received information or adds the received information to the sensed image.

29. A camera system comprising:

a timepiece apparatus which has time measurement means for measuring a current time, and is housed in a first housing, including sensor means for acquiring or generating predetermined measurement information, transmission means for transmitting the measurement information acquired or generated by said sensor means to a camera apparatus; and a camera apparatus which has image sensing means and is housed in a second housing independent from said first housing, including reception means for receiving the measurement information transmitted from said transmission means.

30. A system according to claim 29, wherein said timepiece apparatus is a wristwatch type timepiece apparatus, said camera apparatus is a portable camera apparatus carried by a person who wears said wristwatch type timepiece apparatus on his or her wrist, and said transmission means has weak transmitting power for a near-distance range.

31. A system according to claim 29, wherein said transmission means transmits the information in response to a predetermined operation.

32. A system according to claim 29, wherein said transmission means automatically transmits the information at a predetermined timing.

33. A system according to claim 29, wherein said camera apparatus has time measurement means for measuring a current time, and said time measurement means corrects the current time, which is being measured, on the basis of the time or date information transmitted from said timepiece apparatus.

34. A system according to claim 29, wherein said camera apparatus does not have any time measurement means, and said camera apparatus receives the time or date information transmitted from said timepiece apparatus and displays the received information or adds the received information to the sensed image.

35. A system according to claim 29, wherein said transmission means transmits the information in response to a request signal from said camera apparatus.

36. A system according to claim 35, wherein the request signal is transmitted upon setting time or date information of said camera apparatus.

37. An information recording system which includes information acquisition means for acquiring or generating information required for a daily life or specific action, and image recording means for recording an image, wherein said information acquisition means and image recording means respectively have a portable shape and comprise wireless data transmission/reception means, said information acquisition means comprises transfer control means for transferring the acquired or generated information to said image recording means via said data transmission/reception means, and said image recording means comprises recording control means for recording the information transferred via said data transmission/reception means together with an image.

38. A system according to claim 37, wherein said information acquisition means acquires or generates information corresponding to one of date information, navigation information, and weather information.

39. A system according to claim 37, wherein said data transmission/reception means uses infrared rays as a communication medium.

40. A system according to claim 37, wherein said data transmission/reception means uses a radio wave as a communication medium.

41. An information recording system comprising:

a timepiece apparatus which has time measurement means for measuring a current time and is housed in a first housing;

a camera apparatus which has image sensing means and is housed in a second housing independent from said first housing; and a printer apparatus which has print means and is housed in a third housing independent from said first and second housings, wherein each of said timepiece apparatus, camera apparatus, and printer apparatus has at least one of wireless transmission means and wireless reception means, and said printer apparatus receives data acquired or generated by said timepiece apparatus, and data sensed by said camera apparatus, and prints based on the received data.

42. A wristwatch used in a camera system including a wristwatch having time measurement means, and a camera apparatus having image sensing means, comprising:

transmission means for transmitting data of time or date information measured by said time measurement means to said camera apparatus.

43. A camera apparatus used in a camera system including a wristwatch having time measurement means, and a camera apparatus having image sensing means, comprising:

reception means for receiving data of time or date information transmitted from said wristwatch.

44. A link system for a camera and timepiece, comprising:

a camera which comprises image recording means for electronically recording an image of an object, audio recording means for electronically recording voice input in association with an operation of said image recording means, and transmitting means for transmitting audio data recorded by said audio recording means on a radio wave; and a timepiece which comprises display means that can display a current time, and audio reproduction means for receiving the radio wave from said camera located at a nearby position, and reproducing the audio data.

45. A system according to claim 44, wherein said transmission means transmits the audio data in response to operation of a shutter key provided to said camera.

46. A system according to claim 44, wherein said camera further comprises time measurement means for measuring a current time, and said transmission means transmits the audio data when the current time measured by said time measurement means has reached a preset time.

47. A system according to claim 46, wherein said audio recording means can record a plurality of audio data, and said transmission means transmits at least a latest one of the plurality of recorded audio data.

48. A system according to claim 44, wherein said timepiece further comprises means for transmitting a transmission request of the audio data, said camera further comprises reception means for receiving the transmission request, and said transmission means transmits the audio data in response to the transmission request.

49. A system according to claim 48, wherein said audio recording means can record a plurality of audio data, and said transmission means transmits at least a latest one of the plurality of recorded audio data.

50. A link system for a camera and timepiece, which includes a timepiece and camera, and can transfer data from said timepiece to said camera via communication means, wherein said timepiece comprises audio input means, audio encoding means for encoding audio data input by said audio input means, and transmission means for transmitting the audio data encoded by said audio encoding means by a radio wave, and said camera comprises reception means for receiving the radio wave transmitted from said transmission means, audio data storage means for storing the audio data received by said reception means, and means for associating sensed image data and the received audio data.

51. A system according to claim 50, wherein said camera further comprises means for transmitting the associated audio and image data.

* * * * *